US009251632B2

(12) United States Patent
Saito

(10) Patent No.: US 9,251,632 B2
(45) Date of Patent: Feb. 2, 2016

(54) VEHICLE DIAGNOSTIC SYSTEM

(71) Applicant: HONDA MOTOR CO., LTD., Tokyo (JP)

(72) Inventor: Tatsuro Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 14/281,999

(22) Filed: May 20, 2014

(65) Prior Publication Data

US 2014/0350772 A1 Nov. 27, 2014

(30) Foreign Application Priority Data

May 23, 2013 (JP) ................................ 2013-108712

(51) Int. Cl.
*G01M 17/00* (2006.01)
*G07C 5/08* (2006.01)

(52) U.S. Cl.
CPC .................................... *G07C 5/0808* (2013.01)

(58) Field of Classification Search
CPC ................................ G07C 5/08; G07C 5/0808
USPC ..................... 701/29.1–29.9, 32.7, 34.3, 34.4
See application file for complete search history.

(56) References Cited

U.S. PATENT DOCUMENTS

2010/0312417 A1* 12/2010 Wakabayashi et al. ........... 701/1
2012/0035800 A1* 2/2012 Roberts ........................ 701/29.1
2012/0210154 A1 8/2012 Hartwich

FOREIGN PATENT DOCUMENTS

| | | |
|---|---|---|
| DE | 102009041435 | 3/2011 |
| DE | 102012014724 | 9/2013 |
| EP | 1662714 | 5/2006 |
| JP | 2010-280314 | 6/2009 |
| JP | 2011-24100 | 2/2011 |
| JP | 2013-028238 | 2/2013 |
| JP | 2013-107453 | 6/2013 |

OTHER PUBLICATIONS

German Search Report dated Jan. 23, 2015 with English translation, 16 pages.
Japanese Office Action dated Oct. 8, 2015, 2 pages.
Japanese Office Action dated Mar. 17, 2015, 2 pages.

* cited by examiner

*Primary Examiner* — Luke Huynh
(74) *Attorney, Agent, or Firm* — Rankin, Hill & Clark LLP

(57) ABSTRACT

A vehicle diagnostic system capable of diagnosing ECUs for partial networking includes a communication bus mounted on a vehicle, a plurality of controllers for controlling vehicle operations, and a diagnostic equipment to collect diagnostic information from the controllers through the communication bus and to diagnose the vehicle operations. The controllers are connected with each other through the communication bus. Each of controllers operates in a normal mode and in a sleep mode, the sleep mode being an operation mode in which all of or a part of the functions excluding at least a function for receiving an wake-up instruction to return to the normal mode through the communication bus are suspended. At least one of the controllers is configured to send the wake-up instruction to all the other controllers in response to receiving a predetermined signal from the diagnostic equipment.

4 Claims, 26 Drawing Sheets

VEHICLE DIAGNOSTIC SYSTEM

FIELD OF THE INVENTION

The present invention relates to a vehicle diagnostic system which collects diagnostic information from ECUs (Electronic Control Units) controlling operation of a host vehicle and diagnoses the operation based on the collected information.

RELATED ART

As a prior art, a failure diagnosis system for a vehicle which collects diagnostic information from ECUs via an in-vehicle network is known (Patent Document 1). In this system, the ECUs are communicatively connected to each other through the in-vehicle network, and one of the ECUs is assigned as a parent ECU which collects self-diagnostic information from all the other (child) ECUs.

In response to receiving a request from an analysis tool connected to the network, the parent ECU extracts specific information from the collected diagnostic information depending on a type of the received request, and sends the extracted information to the analysis tool. In this system, the ECUs are prevented from transmitting all of the diagnostic information individually to the analysis tool, so that the efficiency of information transmission may be improved.

In recent years, for reducing power consumption of in-vehicle electronic devices and consequently reducing fuel consumption of the vehicle, partial networking technology has been developed. In the partial networking, ECUs each operable both in normal mode and in sleep mode are connected to an in-vehicle network. In the normal mode, ECU can perform all of its operation function, while, in the sleep mode, ECU reduces its power consumption by suspending almost all operation other than a few limited operation functions. In a partial networking system, only ECUs necessary for current vehicle operations are set to the normal mode, and ECUs unnecessary for the current vehicle operations are set to the sleep mode (i.e., the in-vehicle network is partially activated), to reduce a total power consumption of the network.

For diagnosing the vehicle operation, a diagnostic equipment may be plugged into the network during the ignition switch ON, and start a diagnostic operation for ECUs. However, in such a partial networking system, even when the diagnostic equipment is about to start the diagnostic operation, some ECUs may operate in the sleep mode depending on the current vehicle operation. In each of ECUs in sleep mode (hereinafter also referred to as "sleep-mode ECU"), almost all operation including its communication function are suspended, so that the diagnostic equipment can not communicate with the sleep-mode ECUs, and thus can not collect diagnostic information from them.

Therefore, the diagnostic equipment plugged into the partial networking system needs to first "wake up" the sleep-mode ECUs to normal mode, before starting the diagnostic process.

Generally, a vehicle diagnostic equipment conforms with the international standards about diagnostic communication (i.e., communication for diagnosis). For example, CAN (Controller Area Network) communication standard is broadly applied to in-vehicle devices. In CAN communication, a data block called as "frame" of which the maximum bit length is defined is used as an unit of information for transmission. And, the diagnostic equipment which collects diagnostic information from ECUs in conformity with the CAN communication standard further conforms to the international standards for the diagnostic communication, with respect to e.g., frame definitions and a communication protocol.

And, in a diagnostic equipment for practical use, the frame definitions and the communication protocol are implemented in a software platform, for example, as built-in functions. And, application programs for collecting and analyzing the diagnostic information may be executed on the software platform.

However, a frame (wake-up frame) for instructing the sleep-mode ECUs to return to the normal mode is not based on the international standards for the diagnostic communication. Thus, the software platform in the conventional diagnostic equipment does not have a software interface for transmitting the wake-up frame, so that the diagnostic equipment can not instruct directly sleep-mode ECUs to return to the normal mode.

Therefore, to send the wake-up frame from the diagnostic equipment to ECUs directly, the diagnostic equipment needs to be modified in its software platform with a high cost, for handling the wake-up frame not conforming to the standards of the diagnostic communication.

PRIOR ART DOCUMENT

Patent Document 1: JP2013-28238 A

SUMMARY OF THE INVENTION

Problem to be Solved

From the background mentioned above, a vehicle diagnostic system which is capable of waking up the sleep-mode ECUs in the partial networking and collecting diagnostic information from the ECUs is desired to be realized without modifying a software platform in a diagnostic equipment.

Solution to the Problem

One aspect of the present invention is directed to a vehicle diagnostic system. The system comprises a communication bus mounted on a vehicle, and a plurality of controllers for controlling vehicle operations. The controllers are connected with each other through the communication bus. The system further comprises a diagnostic equipment to collect diagnostic information from the controllers through the communication bus and to diagnose the vehicle operations. Each controller operates both in a normal mode and in a sleep mode. Here, the normal mode is an operation mode in which all of functions are operational, and the sleep mode is an operation mode in which all of or a part of the functions excluding at least a function for receiving an wake-up instruction to return to the normal mode through the communication bus are suspended. And, in the system, at least one of the controllers is configured to send the wake-up instruction to all the other controllers in response to receiving a predetermined signal from the diagnostic equipment.

In another aspect of the present invention, at least two of the controllers are configured to send the wake-up instruction to the other controllers in response to receiving the predetermined signal from the diagnostic equipment. And, if one of the at least two of the controllers is in a state incapable of communication, the diagnostic equipment sends the predetermined signal to another one of the at least two of the controllers.

In still another aspect of the present invention, at least two of the controllers are configured to send the wake-up instruction to the other controllers in response to receiving the predetermined signal from the diagnostic equipment. The diagnostic equipment determines whether each of the controllers is in a state capable of communication. And, the diagnostic equipment selects one controller determined to be in a state capable of communication from the at least two of the controllers and sends the predetermined signal to the selected one controller.

In yet another aspect of the present invention, the diagnostic equipment selects the one controller according to predetermined criteria.

In further aspect of the present invention, the predetermined criteria is that, searching controllers capable of communication among the at least two of the controllers in a predetermined order, the controller found first is selected as the one controller.

In still further aspect of the present invention, at least two of the controllers are configured to send the wake-up instruction to the other controllers in response to receiving the predetermined signal from the diagnostic equipment. The diagnostic equipment is configured to send the predetermined signal to the at least two of the controllers simultaneously. Each of the at least two of the controllers is assigned a different length of an observation time. And, each of the at least two of the controllers sends the wake-up instruction to the other controllers if it does not receives the wake-up instruction from any one of the other controllers within the observation time assigned to its own controller, after receiving the predetermined signal.

Other aspect of the present invention is directed to a vehicle having an in-vehicle network in which a plurality of controllers for controlling vehicle operations are connected with each other through a communication bus. The network forms a vehicle diagnostic system with a diagnostic equipment to be connected to the bus. Each controller operates both in a normal mode and in a sleep mode. Here, the normal mode is an operation mode in which all of functions are operational, and the sleep mode is an operation mode in which all of or a part of the functions excluding at least a function for receiving an wake-up instruction to return to the normal mode through the communication bus are suspended. And, at least one of the controllers is configured to send the wake-up instruction to all the other controllers in response to receiving a predetermined signal from the diagnostic equipment.

According to the present invention, a diagnostic equipment may be used without modifying its software platform, to instruct ECUs for partial networking to return from the sleep mode to the normal mode and collect diagnostic information from each of the ECUs.

DESCRIPTION OF EMBODIMENTS

The embodiments according to the present invention will now be described with reference to the accompanying drawings.

<<First Embodiment>>

Figure 1:
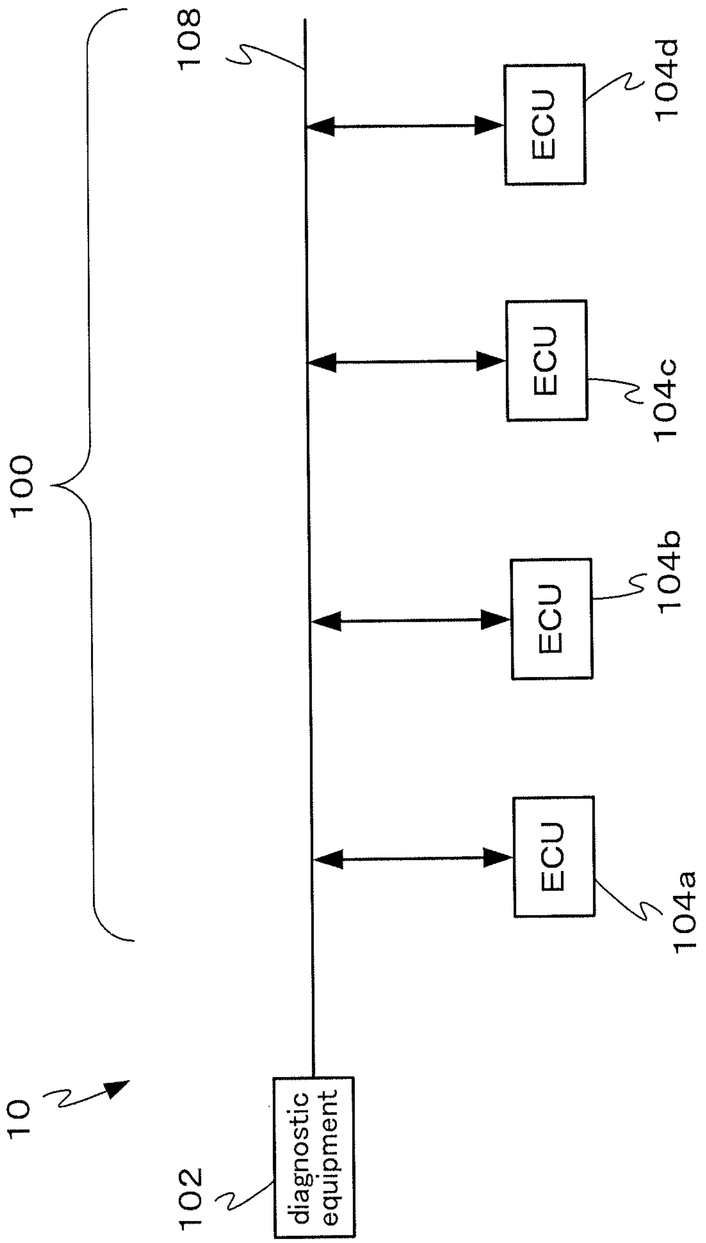
FIG. 1 illustrates a configuration of a vehicle diagnostic system according to a first embodiment of the present invention.

FIG. 1 illustrates a configuration of a vehicle diagnostic system according to a first embodiment of the present invention. The diagnostic system 10 includes an in-vehicle network 100 in which a plurality of ECUs are connected communicatively with each other through a bus, and a diagnostic equipment 102 plugged in the network 100.

The in-vehicle network 100 comprises a plurality of ECUs, e.g., ECUs 104*a* through 104*d*, and the bus 108 connecting communicatively these ECUs 104*a*-104*d* with each other. Each of ECUs 104*a*-104*d* controls a different operation of a host vehicle in which the network 100 is implemented. Specifically, each of ECUs 104*a*-104*d* may be an FI-ECU (Fuel Injection-ECU) for controlling a fuel injection of an engine, an immobilizer ECU to authenticate a vehicle key, a power window ECU for controlling open/close operations of power windows on vehicle doors, a steering ECU for controlling a steering operation, or a power seat ECU for controlling an adjustment operation of power seats in the host vehicle, etc.

However, with relation to a diagnostic operation performed in the system 10, i.e., with respect to collaborative operations with the diagnostic equipment 102, all ECUs 104*a*-104*d* operate similarly. Thus, hereinafter, when ECUs 104*a*-104*d* are referred in relation to diagnostic operations in the system 10, these ECUs are collectively referred to as "ECUs 104*a*-104*d*" or simply "ECUs 104". And, only when one of the ECUs 104*a*-104*d* is necessary to be referred individually, the one specific ECU is designated by its individual reference sign, like "ECU 104*a*", "ECU 104*b*", etc.

Each of ECUs 104*a*-104*d* and the diagnostic equipment 102 are connected to each other through the bus 108 in conformity with e.g., CAN communication standard. As described above, in CAN communication, a data block called as "frame" of which the maximum bit length is defined is used as an unit of information for transmission. Each of frames includes an identifier (ID) indicative of the nature of the information to be transmitted by its own frame. When receiving a frame, the ECU recognizes e.g., whether the received frame was sent to its own ECU, from which device the frame was sent, what kind of information the frame includes, etc., by checking the ID (usually expressed by a value or a number) included in the received frame. What number (or value) of ID indicates what nature of a frame may be predefined by the designer.

Hereinafter, reading like "the diagnostic equipment 102 sends a communication request frame to ECU 104*a*" shall mean that a frame which includes a predetermined ID number indicating that a sender device is the equipment 102, a destination device is ECU 104*a*, and its own frame is a communication request frame, is generated and sent out to the bus 108 by the equipment 102, for example. That "its own frame is a communication request frame" may be indicated alternatively by a combination of ID number and attribute data included in the frame. The attribute data may be predefined.

Each of the ECUs 104 is configured to operate both in a normal mode and a sleep mode, and forms a partial networking system with the bus 108. Each of the ECUs 104 is also configured to receive, in conformity with CAN partial networking standards, a special frame (hereinafter referred to as "wake-up flame") for waking up sleep-mode ECUs 104 to a normal mode. And, each of ECUs 104 is further configured to generate the wake-up frame and to send the generated wake-up frame to other ECUs 104, in conformity with CAN partial networking standards.

Here, the normal mode of the ECU 104 is an operation mode in which all functions implemented in the ECU 104 are operational, and the sleep mode of the ECU 104 is an operation mode in which all of or a part of the functions excluding at least a function for receiving a wake-up frame through the bus 108 are suspended (or stopped) to reduce a power consumption.

Figure 2:
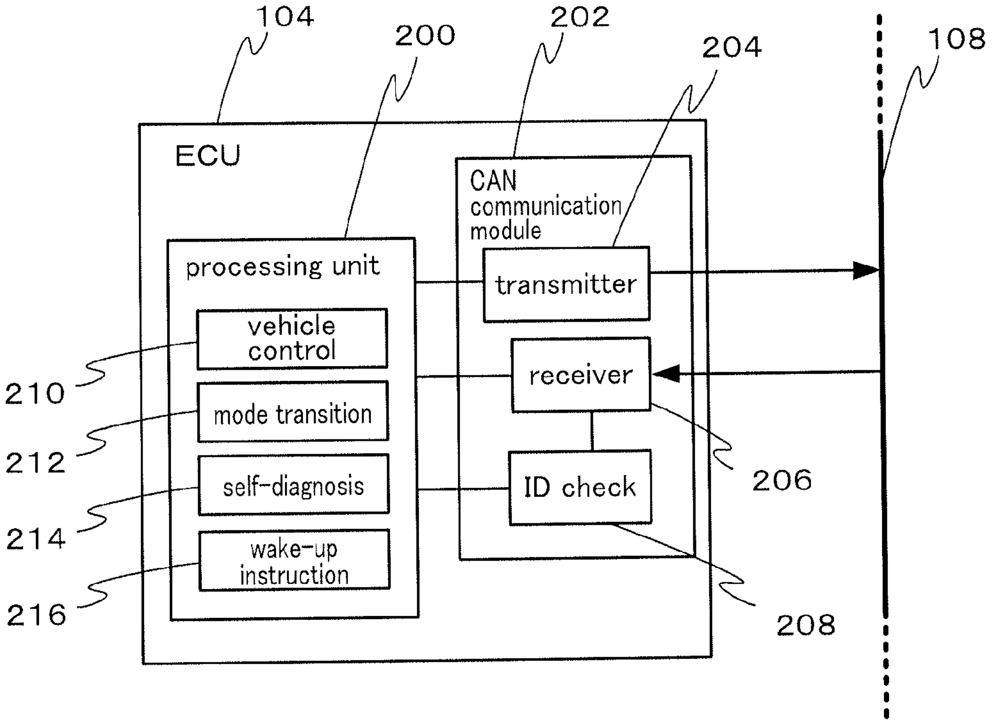
FIG. 2 illustrates a configuration of an ECU used in the vehicle diagnostic system according to the first embodiment.

FIG. 2 is a block diagram illustrating a configuration of the ECU 104. The ECU 104 includes a processing unit 200 and a CAN communication module 202.

The module 202 is a CAN communication interface operable in conformity with CAN partial networking standards. The module 202 includes a transmitter 204, a receiver 206, and an ID check unit 208 to check an ID in a frame received by the receiver 206. The module 202 is operable even when the ECU 104 is in the sleep mode, and is capable of receiving a wake-up frame sent out on the bus 108.

The transmitter 204 receives a frame generated by the processing unit 200, and sends out the generated frame to the bus 108 according to CAN communication protocol.

The receiver 206 receives a frame from the bus 108 according to the CAN protocol. The receiver 206 sends the received frame to the processing unit 200 (when in the normal mode), or to the ID check unit 208 (when in the sleep mode).

The ID check unit 208 determines whether the received flame provided from the receiver 206 is a wake-up frame sent to its own ECU 104, in conformity with CAN partial networking standards. The determination may be performed based on ID number included in the received frame, or, alternatively, based on the data length and/or the data content (e.g., a value of a specific bit) of the received frame, besides the ID number.

If the received frame is determined to be a wake-up frame sent to its own ECU 104, the unit 208 provides the processing unit 200 with a wake-up signal to instruct the unit 200 to return (wake up) to a normal mode.

In this embodiment, the wake-up signal is a hardware interrupt signal provided to a processor (not shown) in the unit 200 for instructing the processor to return from a sleep mode to a normal mode.

The ID number, the data length, and/or the data content which indicate that its own frame is a wake-up frame sent to its own ECU 104 may be defined in a software program to be executed by the unit 200, and information about the definition may be stored (or downloaded) in a memory (not shown) of the CAN communication module 202 at a time when its own ECU 104 starts up. The ID check unit 208 may determine whether the received frame is a wake-up frame sent to its own ECU 104, by referring to the stored information about the definition (e.g., ID number definition) and comparing them with corresponding information (e.g., ID number) included in the received frame.

In this embodiment, the CAN communication module 202 comprises some generic devices such as logic ICs, and/or a hardware including custom ICs such as ASICs (Application Specific Integrated Circuit). Alternatively, the module 202 may comprise a computer having a processor(s). And, all of or a part of functions of each of the transmitter 204, the receiver 206, and the ID check unit 208 may be implemented as a software function(s) realized by the processor executing a software program(s).

The processing unit 200 may be a computer which may have a processor such as CPU (Central Processing Unit) and memories such as ROM (Read Only Memory) storing a software program, RAM (Random Access Memory) used for temporary storage of data, and a nonvolatile memory (e.g., a flash memory) holding stored data even after power-off. The unit 200 can operate both in a normal mode (fully operational mode) and in a sleep mode in which almost all functions are suspended to reduce a power consumption.

In this embodiment, the unit 200 is a computer which may be implemented using known arts in the field of computer engineering. And the unit 200 is configured to operate both in the normal mode and in the sleep mode (or power saving mode). The processor used in the unit 200 may transfer to the sleep mode by executing a specific command, and may return to the normal mode by executing a program starting at a specific address in response to reception of a hardware interrupt signal.

The unit 200 includes a vehicle control unit 210, a mode transition unit 212, a self-diagnosis unit 214, and a wake-up instruction unit 216. The unit 210, the unit 214, and the unit 216 are virtual machines realized by the unit 200 executing a software program(s) as a computer. The unit 212 is also such a virtual machine, but further includes a hardware for processing the hardware interrupt. Alternatively, each of these units may be formed only with hardware. The software program(s) may be stored in any computer readable storage medium.

The vehicle control unit 210 performs a predefined control operation for the host vehicle. Here, the "control operation for the host vehicle" depends on a type of the ECU 104. For example, the operation may be a motor control to open/shut a power window if the ECU 104 is a power-window ECU, or may be a motor control for adjusting a power seat in, e.g., its reclining angle or its position if the ECU 104 is a power seat ECU.

Thus, strictly speaking, the vehicle control unit 210 may be different for each of the ECUs 104*a*, 104*b*, 104*c*, and 104*d*, so that the processing unit 200 may be different for each ECU 104. However, the operation of the diagnostic system 10 is performed independently from the operation of the vehicle control unit 210 in each ECU 104, and the operation of the system 10 can be described in terms of common functional elements of the ECUs 104*a*-104*d* other than the unit 210. Therefore, in the following descriptions, to avoid redundant expressions and to facilitate better understanding, the processing unit 200 is considered as a common element of each ECU 104, without distinguishing the units 210 included in the units 200 of the ECUs 104*a*-104*d* by reference signs, like 210*a*, 210*b*, 210*c*, 210*d*.

The mode transition unit 212 controls a mode switching operation of the ECU 104, i.e., a switching between the normal mode and the sleep mode. When the ECU 104 operates in the normal mode, the unit 212 performs a transfer procedure for transferring the ECU 104 to the sleep mode in response to not receiving a specific signal related to a vehicle control within a predetermined time period. Here, "a specific signal related to a vehicle control" may be, e.g., a signal from a operation switch for a power window mounted on a vehicle door if the ECU 104 is a power-window ECU, or a signal from any one of operation switches for adjusting a power seat in, e.g., its reclining angle or its position if the ECU 104 is a power seat ECU.

Alternatively or additionally, the transfer procedure may be initiated, e.g., in response to receiving a specific command from some management device (not shown) for vehicle operations connected to the bus 108.

The transfer procedure performed by the mode transition unit 212 is a procedure for suspending operations of a predetermined part of hardware of the ECU 104. In the transfer procedure, the unit 212 stores data, values, etc. related to the current vehicle operations in a nonvolatile memory (not shown) of the processing unit 200, and then executes a specific command for transferring the processor to sleep mode. Here, the data and the values to be stored in the nonvolatile memory may include data in a working memory (not shown) and values in registers of the processor.

When the ECU 104 operates in the sleep mode, the mode transition unit 212 performs a return procedure for returning the ECU 104 from the sleep mode to the normal mode in response to the unit 200 receiving the wake-up signal from the ID check unit 208. In the return procedure, the unit 212 reads the stored data, register values, etc. from the nonvolatile memory of the unit 200 and stores them in the corresponding working memory, registers, etc.

After completion of the return procedure, the unit 212 sends out to the bus 108 a wake-up indication frame indicative of its own ECU 104 having returned to the normal mode, and then, the unit 212 transfers execution to a process suspended at the transition to the sleep mode. The wake-up indication frame may be generated so that the frame includes a predefined ID number indicative of a wake-up indication frame sent from its own ECU 104. In the diagnostic system 10 according to this first embodiment, the wake-up indication frame is not essential.

The above described procedures performed at a time of returning from the sleep mode, including the return procedure, may be preprogrammed and stored in, e.g., ROM (not shown) of the unit 200 as a program to be executed from a specific address in response to receiving the wake-up signal as a hardware interrupt from the ID check unit 208. The hardware interrupt may be valid (or permitted) only while the processor of the unit 200 is in sleep mode, and may be invalid (or inhibited) while the processor operates in normal mode. Thus, the ECU 104 in the normal mode keeps (continues) its normal mode operation even when the wake-up frame is received. The enabling/disabling (permission/inhibition) of the hardware interrupt may be set to the processor hardware or to the CAN communication module 202 having the ID check unit 208, by the processor of the unit 200.

The self-diagnosis unit 214 determines whether the received frame provided through the receiver 206 of the CAN communication unit 202 is a diagnosis notice frame for notifying a start of diagnostic process which is sent from the diagnostic equipment 102. And, if the received frame is the diagnosis notice frame, the unit 214 sends a notice response frame to the equipment 102. By receiving the notice response frame, the equipment 102 recognizes that the ECU 104 operates in the normal mode.

The determination whether the received frame is the diagnosis notice frame may be performed by checking whether the ID number and/or the content of data included in the received frame coincides with an predefined ID number and/or a predefined content of data indicative of a diagnosis notice frame. And, the notice response frame may be generated as a frame which includes an predefined ID number and/or a predefined content of data indicative of its own frame being a notice response frame.

Further, the self-diagnosis unit 214 determines whether the received frame provided through the receiver 206 is a diagnosis initiation frame for instructing initiation of a self-diagnosis procedure. And, if the received frame is the diagnosis initiation frame, the unit 214 performs a self-diagnostic procedure for collecting prespecified information (diagnostic information) indicative of whether its own ECU 104 has abnormality in its prespecified operation functions, and, then, the unit 214 sends the collected diagnostic information to the diagnostic equipment 102. The diagnostic information may be sent in the form of one or more diagnostic information frames each of which includes an predefined ID number and/or a predefined content of data indicative of its own frame being a diagnostic information frame and includes data indicative of all of or a respective part of the diagnostic information.

The wake-up instruction unit 216 determines whether the received frame provided through the receiver 206 is a communication request frame. And, if the received frame is a communication request frame, the unit 216 sends, in conformity with CAN partial networking standards, a wake-up frame to all of the other ECUs 104 on the bus. The communication request frame is a frame which the diagnostic equipment 102 sends to only one ECU 104. By sending the communication request frame, the diagnostic equipment 102 instructs the one ECU 104 to transmit a wake-up frame to all of the other ECUs 104 so that all ECUs 104 would be in a state capable of communication.

By the transmission of the wake-up frame from the one ECU, all of the other ECUs 104 connected to the bus 108 are ensured to operate in the normal mode, i.e., in a state capable of communication with the diagnostic equipment 102. The determination whether the received frame is a communication request frame may be performed by checking whether the ID number and/or the content of data included in the received frame coincides with an predefined ID number and/or a predefined content of data indicative of a communication request frame.

Next, the diagnostic equipment 102 will be described.

The equipment 102 collects diagnostic information from each of the ECUs 104, conforming with the standards for the diagnostic communication and using frames defined by said standards (i.e., without sending and receiving frames undefined by said standards).

In this embodiment, in order to set sleep-mode ECUs 104 to the normal mode before collecting the diagnostic information, the equipment 102 selects one ECU 104 and sends the communication request frame to the selected one ECU 104 for requesting the selected one ECU 104 to send a wake-up frame to all of the other ECUs 104. Hereinafter, one ECU 104 which sends a wake-up frame to all of the other ECUs 104 is referred to as a "proxy ECU".

More specifically, the equipment 102 selects a predetermined ECU 104 as the proxy ECU and sends a communication request frame to the ECU 104 (hereinafter referred to as "proxy ECU 104") selected as the proxy ECU. In the proxy ECU 104 which received the communication request frame, the wake-up instruction unit 216 (FIG. 2) sends a wake-up frame to all the other ECUs 104.

As a result, the sleep-mode ECUs 104 among the other ECUs 104 return to the normal mode while the ECUs 104 (hereinafter referred to as "normal-mode ECUs 104") operating in the normal mode maintain their normal mode operation. That is, all of the ECUs 104 on the bus 108 are ensured to operate in the normal mode, and, consequently, the diagnostic equipment 102 can collect the diagnostic information from all of the ECUs 104.

Figure 3:
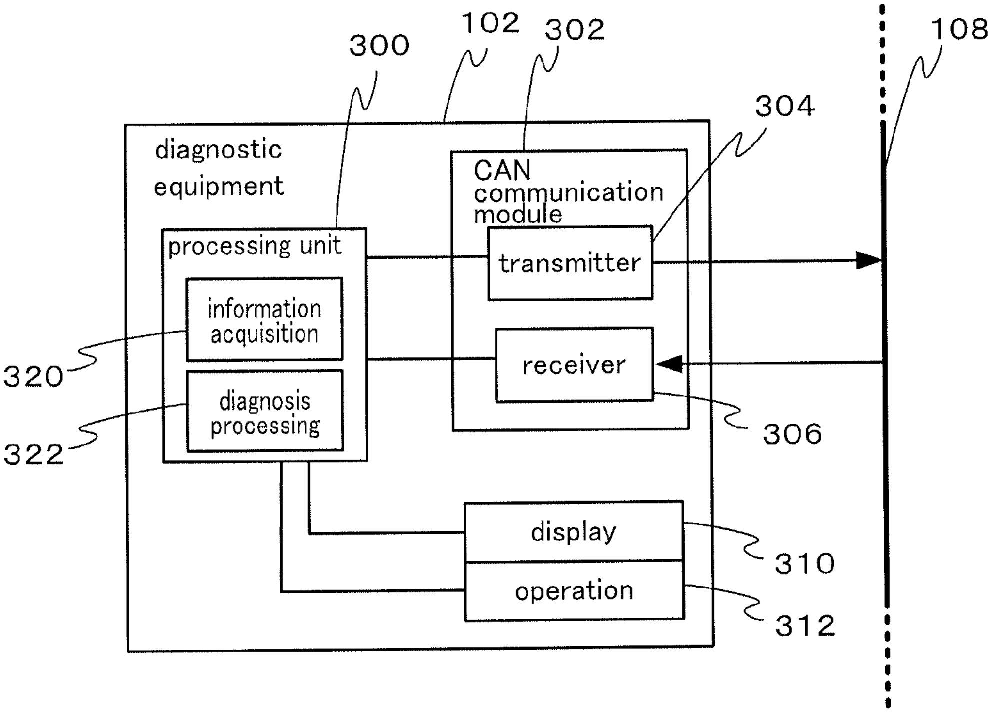
FIG. 3 illustrates a configuration of a diagnostic equipment used in the vehicle diagnostic system according to the first embodiment.

FIG. 3 is a block diagram illustrating a configuration of the diagnostic equipment 102. The equipment 102 includes a processing unit 300, a CAN communication module 302 which is a CAN communication interface, a display unit 310, and an operation unit 312.

The CAN communication module 302 includes a transmitter 304, and a receiver 306. The transmitter 304 receives a frame (a data string formed in accordance with any relevant standards) generated by the processing unit 300 and sends out the generated frame to the bus 108 in conformity with CAN communication standards. The receiver 306 receives a frame from the bus 108 in conformity with the CAN communication standards and sends the received frame to the unit 300.

In this embodiment, the CAN communication module 302 comprises some generic devices such as logic ICs and/or a hardware including custom ICs such as ASICs. Alternatively, the module 302 may comprises a computer having a processor(s). And, all of or a part of the function of each of the transmitter 304 and the receiver 306 may be implemented as a software function(s) realized by the processor executing a software program(s).

The display unit 310 may comprises an LCD (Liquid Crystal Display). The unit 310 displays, e.g., diagnostic information collected from the ECUs 104 and messages for a user.

The operation unit 312 is an input device which is used by the user for inputting data and/or instructions to the diagnostic equipment 102. The unit 312 may be a touch panel mounted on a screen of the display unit 310, a keypad disposed on a chassis of the equipment 102, and/or a console of the equipment 102.

The processing unit 300 may be a computer which may have a processor such as CPU and memories such as ROM storing a software program, RAM used for temporary storage of data. The unit 300 includes a information acquisition unit 320 and a diagnostic processing unit 322. The units 320, 322 are virtual machines realized by the unit 300 executing software programs as a computer.

The software programs executed by the unit 300 includes, for example, programs for forming a software platform having some basic functions such as a function to communicate in accordance with frame definitions and a communication protocol specified in the standards for the diagnostic communication, and application programs to be executed on the platform for collecting and analyzing the diagnostic information by using such basic functions.

The units 320, 322 may be virtual machines realized by the unit 300 executing specific application programs on the software platform, for example.

The computer programs such as those for forming the software platform and application programs to be executed on the platform may be stores in any computer readable medium.

The information acquisition unit 320 selects a predetermined ECU 104 as the proxy ECU and instructs the proxy ECU 104 to send a wake-up frame to other ECUs 104. Information about the predetermined ECU 104 (i.e., information indicating which ECU 104 is the predetermined ECU 104) may be stored in advance in a storage device (not shown) of the unit 300 or may be described in the program executed by the unit 300.

The predetermined ECU 104 to be selected as the proxy ECU may be an ECU which operates in the normal mode with high probability during the ignition switch ON, more specifically, an FI-ECU (Fuel Injection ECU) for controlling a fuel injection of an engine, for example.

The information acquisition unit 320 sends a diagnosis notice frame to the proxy ECU 104 (i.e., the predetermined ECU 014 selected as a proxy ECU), and the proxy ECU 104 sends a notice response frame in response to receiving the diagnosis notice frame. By receiving the notice response frame, the unit 320 recognizes that the proxy ECU 104 is in a state capable of communication.

And then, the information acquisition unit 320 sends a communication request frame to the proxy ECU 104 for requesting it to send a wake-up frame to all the other ECUs 104, in order to set them in the normal mode, i.e., in a state capable of communication.

Further, after a time necessary and sufficient for sleep-mode ECUs 104 to return to the normal mode has elapsed since the communication request frame was sent, the unit 320 sends to all the ECUs 104 to be diagnosed a diagnosis initiation frame for instructing them to start a self-diagnosis procedure. After that, the unit 320 collects diagnostic information by receiving a diagnostic information frame(s) sent from each of the ECUs 104, and the unit 320 sends the collected diagnostic information to the diagnostic processing unit 322.

The unit 322 receives the diagnostic information from the information acquisition unit 320 and performs predefined data processing on the received diagnostic information. And then, the unit 322 provides the processed diagnostic data to the display unit 310.

The communication request frame and the diagnosis initiation frame may be formed as frames each of which includes a predetermined ID number and/or a predetermined content of data indicative of a communication request frame and a diagnosis initiation frame, respectively.

Figure 4:
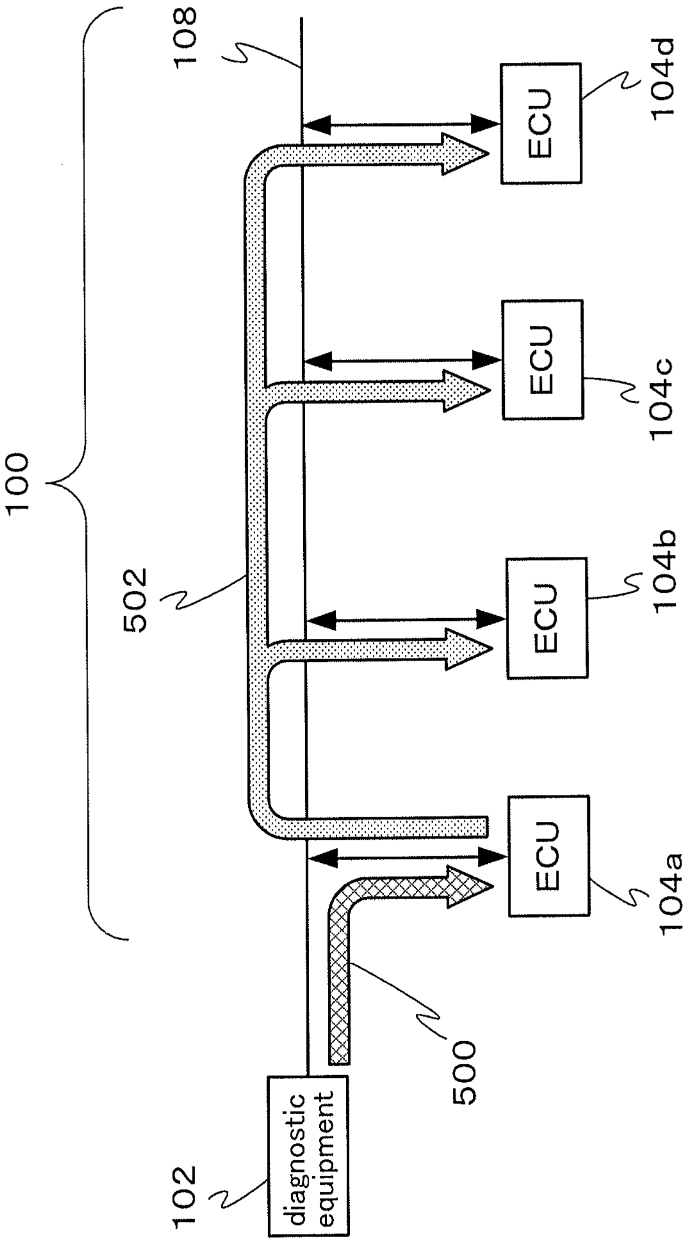
FIG. 4 illustrates an outline of operation of the vehicle diagnostic system according to the first embodiment.

FIG. 4 illustrates an outline of operation of the diagnostic system 10 according to this embodiment. In an example shown in FIG. 4, it is assumed that the ECU 104*a* is the predetermined ECU 104 to be selected as the proxy ECU and information about the predetermined ECU 104 are stored in the processing unit 300 in advance.

After plugged into the bus 108, the diagnostic equipment 102 first selects the ECU 104*a* as the proxy ECU, and then, the equipment 102 sends a diagnosis notice frame to the proxy ECU 104*a*.

In response to receiving the diagnosis notice frame, the ECU 104*a* sends a notice response frame to the diagnostic equipment 102. The equipment 102 recognizes, by receiving the notice response frame, that the ECU 104*a* is in a state capable of communication.

And then, the equipment 102 sends a communication request frame to the ECU 104*a* (as expressed by an arrow 500 in FIG. 4), and the ECU 104*a* sends a wake-up frame, in response to receiving the communication request frame, to all the other ECUs 104*b* through 104*d* (as expressed by an arrow 502 in FIG. 4). As a result, the sleep-mode ECU(s) 104 among the ECUs 104*b* through 104*d* returns to the normal mode while the normal-mode ECU(s) 104 among the ECUs 104*b* through 104*d* maintains its normal mode operation, so that all of the ECUs 104*a* through 104*d* are ensured to operate in the normal mode.

After a predetermined time has elapsed since the sending of the communication request frame, the diagnostic equipment 102 sends a diagnosis initiation frame to all of the ECUs 104*a* through 104*d* to instruct them to start a self-diagnosis and to send their diagnostic information. And then, the equipment 102 collects the diagnostic information of the ECUs 104 by receiving diagnostic information frames sent from the ECUs 104*a* through 104*d*.

As described above, in the diagnostic system 10, the diagnostic equipment 102 sends to one of the ECUs 104 a communication request frame conforming to the standards of the diagnostic communication, and then, the one of the ECU 104 sends a wake-up frame to all the other ECUs 104, to return them to the normal mode capable of communication.

Therefore, in the diagnostic system 10, the diagnostic equipment 102 compliant to the standards for the diagnostic communication can be used without being modified its software platform for handling a wake-up frame not conforming to said standards (i.e., may be used as it is designed), to instruct the ECUs 104 for partial networking to return from the sleep mode to the normal mode and collect the diagnostic information from all of the ECUs 104.

Next, a flow of process in the diagnostic equipment 102 and that in the ECU 104 will be described.

<<Process in the Diagnosis Equipment 102>>

First, a flow of a process in the diagnostic equipment 102 is described with reference to a flow diagram shown in FIG. 5. For example, the process starts automatically at the time when the equipment 102 is plugged into the bus 108 during the ignition switch ON, or the process starts by a user inputting any start command through the operation unit 312 of the equipment 102 after connecting the equipment 102 to the bus 108. Desirably, the plugging of the equipment 102 or the input of the start command is performed after a user have confirmed that a predetermined ECU 104 to be selected as the proxy ECU is in a state capable of communication. Here, the equipment 102 is assumed to be powered on before the plugging or the command input.

At the beginning of this process, the information acquisition unit 320 of the processing unit 300 first selects a predetermined ECU 104 as the proxy ECU (S100), and sends to the ECU 104 (hereinafter referred to as "the proxy ECU 104") selected as the proxy ECU a diagnosis notice frame for notifying a start of diagnostic process (S102).

The unit 320 receives a notice response frame sent from the proxy ECU 104 as a reply for the diagnosis notice frame (S104), and recognizes that the proxy ECU 104 is in a state capable of communication. If the notice response frame from the proxy ECU 104 is not received at the step S104 within a predetermined time period after sending the diagnosis notice frame, the unit 320 may determine that the proxy ECU 104 is not in a state capable of communication, and may execute a predefined error process (e.g., to provide error messages on the display unit 310).

Then, to set all the other ECUs 104 into the normal mode capable of communication, the unit 320 sends a communication request frame to the proxy ECU 104 (S106), for instructing the proxy ECU 104 to send a wake-up frame to all the other ECUs 104.

The unit 320 waits until a predetermined time necessary and sufficient for sleep-mode ECUs 104 to return to the normal mode has elapsed (S108). After the predetermined time is elapsed, the unit 320 sends a diagnosis initiation frame to all of the ECUs 104 to be diagnosed, for instructing them to start their self-diagnosis (S110).

Then, the unit 320 collects diagnostic information by receiving a diagnostic information frame(s) sent from each of the ECUs 104 to be diagnosed (S112), and sends the collected diagnostic information to the diagnostic processing unit 322.

The unit 322 of the diagnosis unit 102 analyzes the received diagnostic information and provides a result of analysis on the display unit 310 (S114). After that, this process terminates.

In this embodiment, only the proxy ECU 104 is confirmed to be in a state capable of communication by the steps S102 and S104. Alternatively, the unit 320 may determine which ECUs 104 are in the normal mode or in the sleep mode, by sending a diagnosis notice frame to all the ECUs 104 at the step S102 and receiving a notice response frame from each ECUs 104 in the normal mode at the step 104.

In this case, if all the ECUs 104 are confirmed to be operating in the normal mode, the process may proceed to the step S110 immediately without executing the steps S106 and S108.

In this embodiment, the diagnosis initiation frame is sent at the step S110 after waiting for elapse of the predetermined time at the step S108. Alternatively, if the unit 320 can determine, in a way as described above, which ECUs 104 are in the sleep mode, the process may proceed to the step S110 immediately, after waiting for receiving the wake-up indication frames from all the ECUs 104 which is determined to be in the sleep mode.

<<Process in the ECU 104>>

Next, flows of processes in the ECU 104 will be described. The ECU 104 performs a mode transition process, a mode restoration process, and a diagnosis-related process. The mode transition process is a process for setting its own ECU 104 to the sleep mode when a predetermined condition is met. The mode restoration process is a process for restoring its own ECU 104 to the normal mode in response to receiving the wake-up frame during the sleep mode. And, the diagnosis-related process is a process related to diagnosis of the host vehicle. The flow of each process is described below.

<Mode Transition Process>

Figure 6:
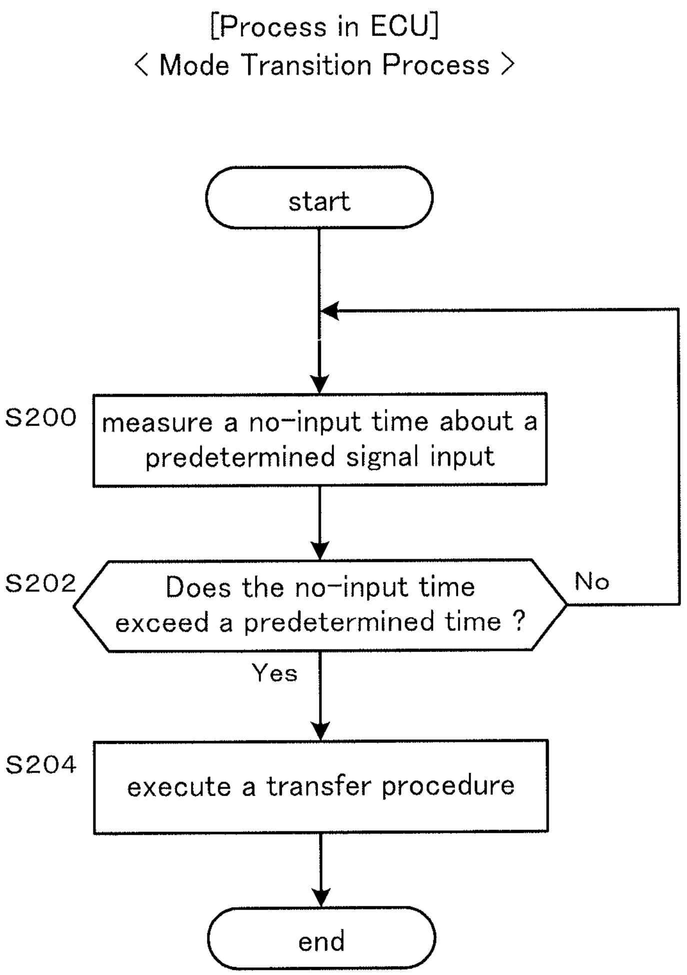
FIG. 6 shows a flow diagram of a mode transition process in the ECU used in the vehicle diagnostic system according to the first embodiment.

First, a flow of the mode transition process is described with reference to a flow diagram shown in FIG. 6.

This process may start at the time when the ECU 104 starts its normal mode operation, and may be executed in parallel with other processes performed in the normal mode. The normal mode operation starts, for example, at the time when the ECU 104 is powered on by turning on the ignition switch or when the ECU 104 returns from the sleep mode to the normal mode.

At the beginning of this process, the mode transition unit 212 of the processing unit 200 measures a time (no-input time) elapsed after a previous input of a predetermined signal regarding vehicle operations (S200) (i.e., measures a time which has elapsed without receiving the signal), and determines whether the no-input time exceeds a predetermined time (S202). And, if the no-input time does not exceed the predetermined time (S202, No), the process returns to the step S200 and the unit 212 continues or repeats the measurement of the no-input time. Here, the "predetermined signal regarding vehicle operations" may be, for example, an input signal from a operation switch for a power window mounted on the vehicle door if its own ECU 104 is a power-window ECU, as mentioned above.

On the other hand, if the no-input time exceeds the predetermined time (S202, Yes), the unit 212 executes a transfer procedure for transferring its own ECU 104 to the sleep mode (S204), and this mode transition process terminates. As described above, in the transfer procedure, the unit 212 stores data, values, etc. related to current vehicle operations in a nonvolatile memory (not shown) of the processing unit 200, and then executes a specific command for transferring the processor (not shown) of the processing unit 200 to sleep mode. Here, the data and the values to be stored in the nonvolatile memory may include data in a working memory (not shown) and values in registers of the processor, for example.

<Mode Restoration Process>

Next, a flow of the mode restoration process in the ECU 104 is described with reference to a flow diagram shown in FIG. 7.

This process may start, e.g., at the time when the ECU 104 transfers from the normal mode to the sleep mode and starts the sleep mode operation.

At the beginning of this process, the receiver 206 of the CAN communication module 202 receives a frame sent out on the bus 108, and sends the received frame to the ID check unit 208 (S300). The unit 208 checks an ID number, a data length, and/or data contents of the received frame and determines whether the received frame is a wake-up frame sent to its own ECU 104 (S302). If the received frame is not the wake-up frame sent to its own ECU 104 (S302, No), the process returns to the step S300 and repeat these steps. Otherwise, i.e., if the received frame is the wake-up frame sent to its own ECU 104 (S302, Yes), the ID check unit 208 provides a wake-up signal to the processing unit 200 (S304).

Then, in response to the wake-up signal being provided to the processing unit 200, the mode transition unit 212 executes the return procedure to resume a suspended control operation by returning its own ECU 104 from the sleep mode to the normal mode (S306). As described above, in the return procedure, the unit 212 may read out from the nonvolatile memory of the unit 200 data, register values, etc. related to the operation suspended by the transfer procedure. And, the unit 212 may store those read-out data and/or values in the corresponding working memory, the processor registers, etc., of the unit 200, for example.

Then, the mode transition unit 212 sends out, e.g., to the diagnostic equipment 102, a wake-up indication frame indicative of its own ECU 104 having returned to the normal mode (S308), and the unit 212 transfers execution to a process suspended at the transition to the sleep mode (S310). After that, this mode restoration process terminates.

<Diagnosis-related Process>

Next, a flow of the diagnosis-related process in the ECU 104 is described with reference to a flow diagram shown in FIG. 8.

This process may start at the time when its own ECU 104 starts the normal mode operation and may be executed in parallel with other processes performed in the normal mode. The normal mode operation starts, for example, at the time when the ECU 104 is powered on by turning on the ignition switch or when the ECU 104 returns from the sleep mode to the normal mode.

At the beginning of this process, the receiver 206 of the CAN communication module 202 first waits for a frame being sent out on the bus 108 and receives a frame when it is sent out (S400). The receiver 206 sends the received frame to the processing unit 200. Then, the unit 200 determines, based on an ID number contained in the received frame, whether the received frame is a frame sent to its own ECU 104 (S402). And, if the received frame is not a frame sent to its own ECU 104 (S402, No), the process returns to the step S400, and the receiver 206 waits for a new frame being sent out.

Otherwise, i.e., if the received frame is a frame sent to its own ECU 104 (S402, Yes), the wake-up instruction unit 216 of the processing unit 200 checks an ID number and data contained in the frame received from the receiver 206, and determines whether the received frame is a diagnosis notice frame (S404). And, if the received frame is a diagnosis notice frame (S404, Yes), the unit 216 sends a notice response frame to the diagnostic equipment 102 (S406). After that, the process returns to the step S400 and repeats.

Otherwise, i.e., if the received frame is not a diagnosis notice frame (S404, No), the wake-up instruction unit 216 checks an ID number and data contained in the received frame, and determines whether the received frame is a communication request frame (S408). And, if the received frame is a communication request frame (S408, Yes), the unit 216 sends a wake-up frame to all the other ECUs 104 connected to the bus 108 (S410). After that, the process returns to the step S400 and repeats.

Otherwise, i.e., if the received frame is not a communication request frame (S408, No), the self-diagnosis unit 214 checks an ID number and data contained in the received frame, and determines whether the received frame is a diagnosis initiation frame (S412). And, if the received frame is a diagnosis initiation frame (S412, Yes), the unit 214 executes a self-diagnostic procedure for collecting diagnostic information about prespecified operations of its own ECU 104 (S414), and sends the collected diagnostic information to the equipment 102 (S416). After that, the process returns to the step S400 and repeats.

Otherwise, i.e., if the received frame is not a diagnosis initiation frame (S412, No), the vehicle control unit 210 controls the vehicle operations assigned to its own ECU 104 (for example, a fuel injection operation if its own ECU is an FI-ECU), according to an instruction and/or data given by the received frame (S418), and the process returns to the step S400 and repeats. Here, the instruction and/or data may be identified (or recognized) based on the ID number and/or data included in the received frame.

This diagnosis-related process terminates when the normal mode operation of its own ECU 104 terminates. The normal mode operation may terminate when its own ECU 104 is powered off by turning off the ignition switch or when the mode transition unit 212 sets its own ECU 104 to the sleep mode, for example.

<<Overall Process of the System 10>>

Next, to facilitate better understanding of operation in the diagnostic system 10, an overall flow of process in the system 10 is described below according to a flow diagram shown in FIG. 9 with reference to the example of the operation shown in FIG. 4. This process in the system 10 is a combination of the process in the diagnostic equipment 102 shown in FIG. 5 and the processes in the ECUs 104 shown in FIGS. 7 and 8.

Figure 5:
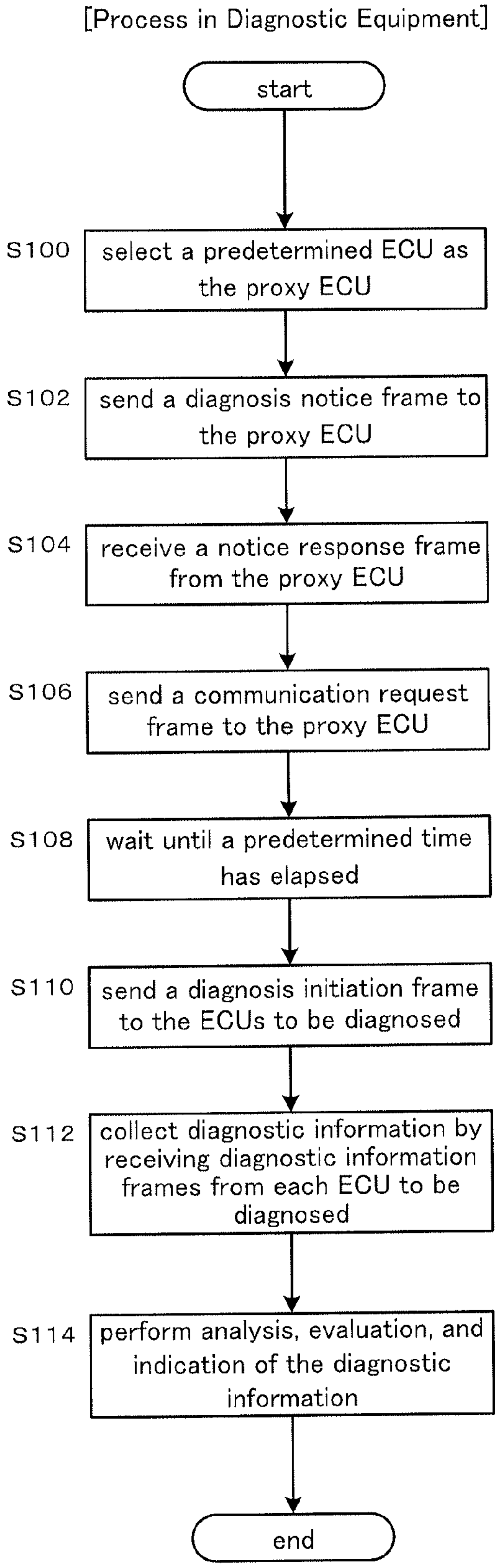
FIG. 5 shows a flow diagram of a process in the diagnostic equipment used in the vehicle diagnostic system according to the first embodiment.

This process starts with the process of the equipment 102 shown in FIG. 5. That is, this process starts at the time when the process in the equipment 102 starts.

At the beginning of this process, the equipment 102 selects a predetermined ECU 104, e.g., the ECU 104*a* in FIG. 4, as the proxy ECU (S500) (which corresponds to the step S100 in FIG. 5), and sends a diagnosis notice frame to the proxy ECU 104*a* (S502) (which corresponds to the step S102 in FIG. 5).

Figure 8:
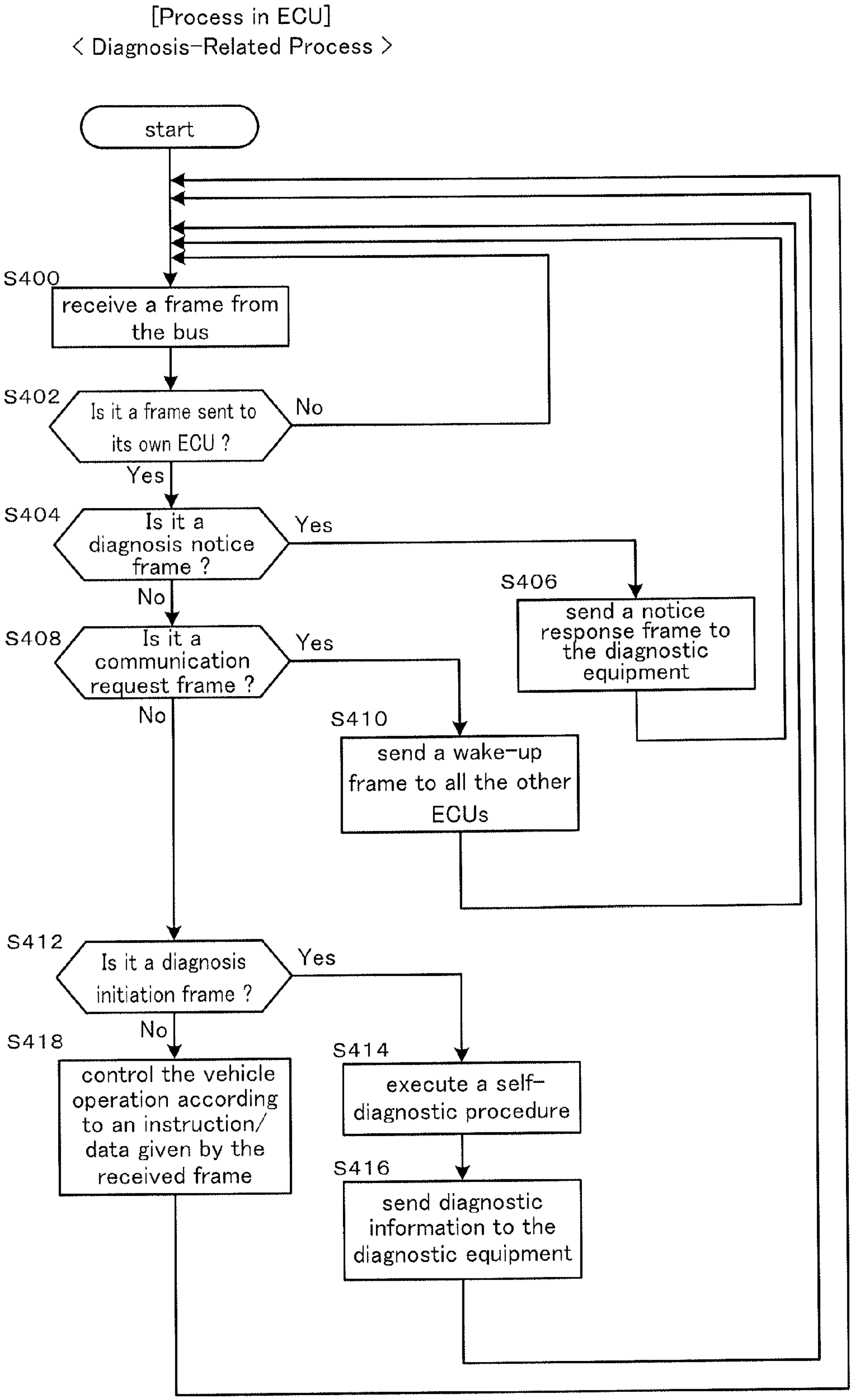
FIG. 8 shows a flow diagram of a diagnosis-related process in the ECU used in the vehicle diagnostic system according to the first embodiment.

The proxy ECU 104*a* receives the diagnosis notice frame and sends a notice response frame to the equipment 102 (S504) (which corresponds to the steps S400 through S406 in FIG. 8).

In response to receiving the notice response frame, the equipment 102 sends a communication request frame to the proxy ECU 104*a* (S506) (which corresponds to the steps S104, S106 in FIG. 5), as expressed by an arrow 500 in FIG. 4. Then, in response to receiving the communication request frame, the proxy ECU 104*a* sends a wake-up frame to all of the other ECUs 104 (S508) (which corresponds to the steps S400 through S404, S408, and S410 in FIG. 8), as expressed by an arrow 502 in FIG. 4.

Figure 7:
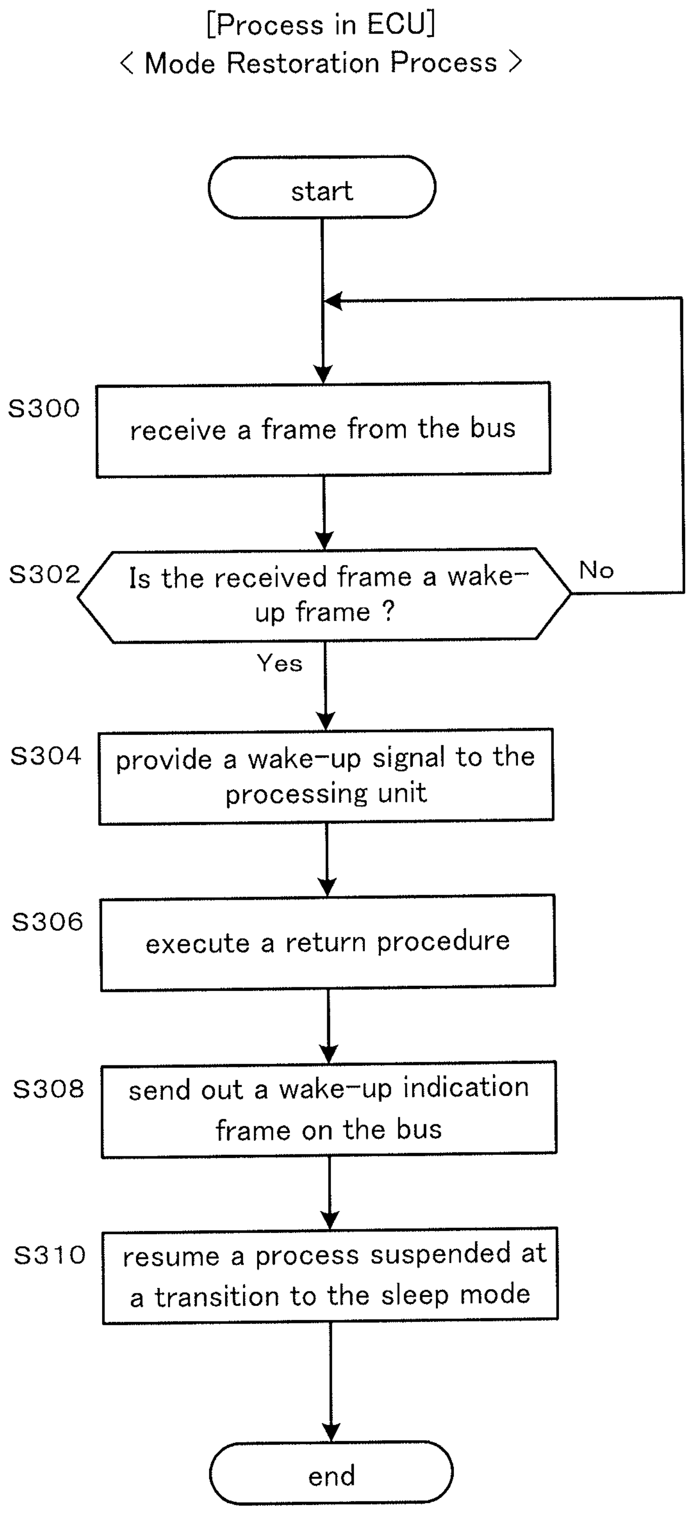
FIG. 7 shows a flow diagram of a mode restoration process in the ECU used in the vehicle diagnostic system according to the first embodiment.

In response to receiving the communication request frame, all the sleep-mode ECUs 104 (among the ECUs 104*b* through 104*d*), if any, return to the normal mode (S510) (which corresponds to the steps S300 through S310 in FIG. 7).

After a predetermined time necessary and sufficient for the all the sleep-mode ECUs 104 (among the ECUs 104*b* through 104*d*) to return to the normal mode has elapsed, the diagnostic equipment 102 sends to all the ECUs 104 to be diagnosed a diagnosis initiation frame for instructing them to start their self-diagnosis (S512) (which corresponds to the steps S108, S110 in FIG. 5).

Each of the ECUs 104 which receive the diagnosis initiation frame executes their self-diagnosis procedure and sends the collected diagnostic information to the diagnostic equipment 102 (S514) (which corresponds to the steps S400-S404, S408, S412-S416 in FIG. 8).

The equipment 102 receives the diagnostic information and performs analysis, evaluation, indication, etc. of the received diagnostic information (S516) (which corresponds to the steps S112, S114 in FIG. 5). After that, this process terminates.

In this embodiment, all the ECUs 104 connected to the bus 108 have their own wake-up instruction unit 216. Alternatively, only at least one ECU 104 including a predetermined ECU 104 to be selected as a proxy ECU may have the wake-up instruction unit 216, i.e., a function to send a wake-up frame in response to receiving a communication request frame.

In this embodiment, the diagnostic equipment 102 confirms that the proxy ECU 104 is in a state capable of communication, by receiving a notice response frame sent from the proxy ECU 104 in response to receiving a diagnosis notice frame from the equipment 102. Alternatively, this confirmation on the communication capability of the proxy ECU 104 may be not performed. In the case where the confirmation is not performed by the equipment 102, preferably a user confirms that the proxy ECU 104 is in a state capable of communication, before plugging the equipment 102 to the bus 108, or before providing the equipment 102 with a command for starting its operation.

And, in this embodiment, the proxy ECU 104 sends a wake-up frame to all the other ECUs 104, in response to receiving a communication request frame. Alternatively, the proxy ECU 104 may send a wake-up frame to all the other ECUs 104 just after sending a notice response frame to the equipment 102 in response to receiving a diagnosis notice frame from the equipment 102, without waiting for the reception of a communication request frame from the equipment 102. In this case, a transmission of the communication request frame from the equipment 102 is not necessary, so that the process may be simplified and a turn-around time for collecting diagnostic information may be reduced.

<<Second Embodiment>>

Next, a vehicle diagnostic system according to a second embodiment of the present invention will be described.

In this system, a plurality of ECUs are predetermined as candidates of the proxy ECU and information about the candidates are stored in a diagnostic equipment in advance. The diagnostic equipment searches for one ECU capable of communication among the candidates in a predetermined order, and selects the one ECU found by the search as the proxy ECU. Then, the equipment returns other sleep-mode ECUs to the normal mode, through the proxy ECU.

In this embodiment, the equipment searches one ECU capable of communication among the plurality of ECUs predetermined as the candidates, so that, even if the candidates include a failed ECU incapable of communication, the equipment may find one ECU capable of communication among the plurality of candidate and may select the one ECU as the proxy ECU. Thus, the reliability of the diagnostic system operation may be improved.

Figure 10:
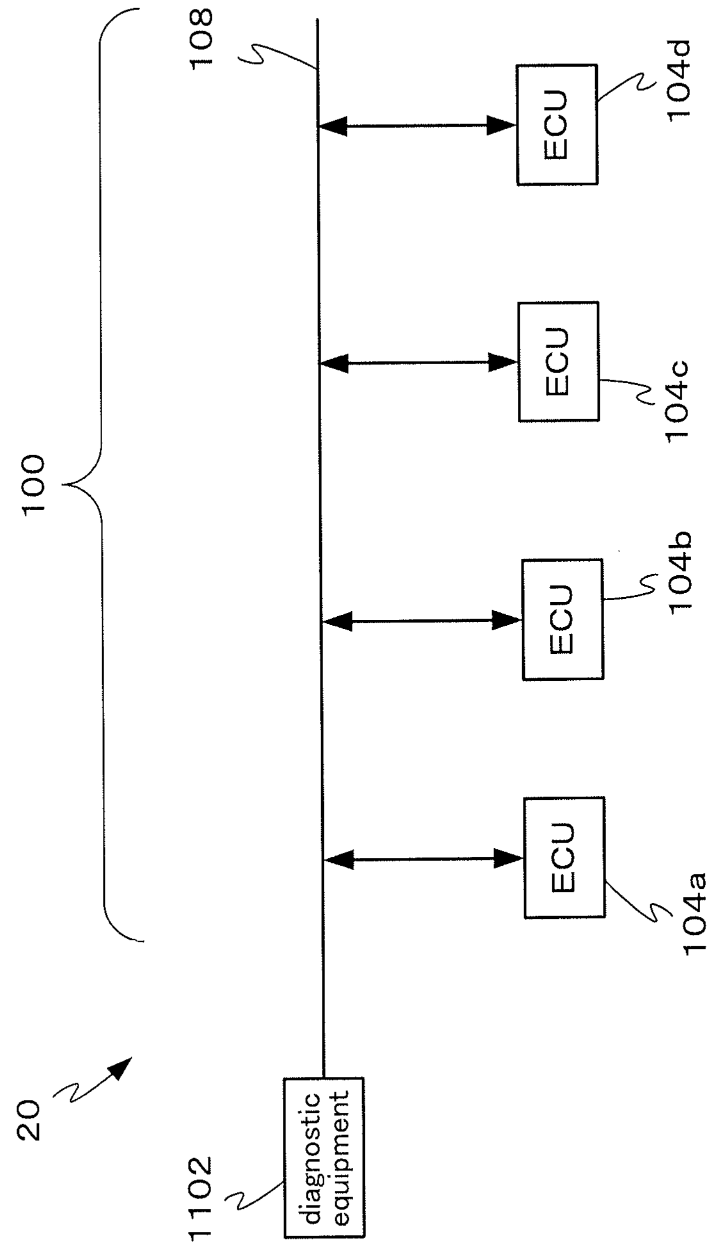
FIG. 10 illustrates a configuration of a vehicle diagnostic system according to a second embodiment of the present invention.

FIG. 10 illustrates a configuration of a vehicle diagnostic system according to the second embodiment of the present invention. The diagnostic system 20 has the same configuration as that of the system 10 according to the first embodiment with the exception of including a diagnostic equipment 1102 instead of the equipment 102. In FIG. 10, the elements identical with those shown in FIG. 1 are designated by the same reference numerals as those in FIG. 1. And, with respect to the elements designated by the same reference numerals as those in FIG. 1, the above descriptions about FIG. 1 are incorporated here.

Figure 11:
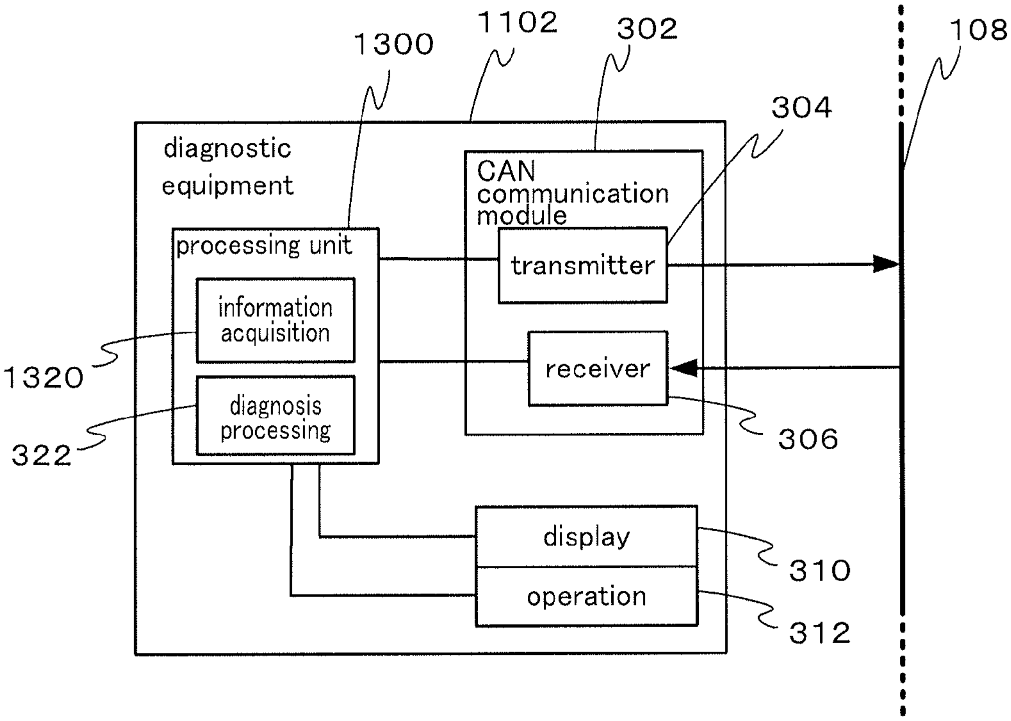
FIG. 11 illustrates a configuration of a diagnostic equipment used in the vehicle diagnostic system according to the second embodiment.

FIG. 11 is a block diagram illustrating a configuration of the diagnostic equipment 1102. The equipment 1102 has the same configuration as that of the equipment 102 according to the first embodiment with the exception of including a processing unit 1300 instead of the unit 300. In the FIG. 11, the elements identical with those shown in FIG. 3 are designated by the same reference numerals as those in FIG. 3. And, with respect to the elements designated by the same reference numerals as those in FIG. 3, the above descriptions about FIG. 3 are incorporated here.

The processing unit 1300 has the same configuration as that of the unit 300 with the exception of including an information acquisition unit 1320 instead of the unit 320. The unit 1320 may be a virtual machine realized by the unit 1300 executing software programs as a computer.

The information acquisition unit 1320 has the same function as that of the unit 320 according to the first embodiment with the exception of searching one ECU 104 capable of communication among a plurality of ECUs 104 (hereinafter referred to as "candidate ECUs 104") predetermined as candidates of the proxy ECU in a predetermined searching order, and selecting the one ECU 104 found by the search as the proxy ECU.

More specifically, the information acquisition unit 1320 searches one ECU 104 capable of communication, by transmitting a diagnosis notice frame to each candidate ECU 104 and confirming a reception of a notice response frame from the each candidate, in the predetermined searching order. And, the unit 1320 selects the ECU 104 from which the unit 1320 first receives a notice response frame, as the proxy ECU.

The predetermined candidate ECUs 104 may be a predetermined number of ECUs 104 having highest possibilities of operating at the normal mode, for example. And the predetermined searching order may be a descending order of the possibility of operating at the normal mode.

Information about the predetermined candidate ECUs 104 and the predetermined searching order may be stored in a storage unit (not shown in figures) of the processing unit 1300 in advance, or may be described in programs to be executed by the unit 1300.

Figure 12:
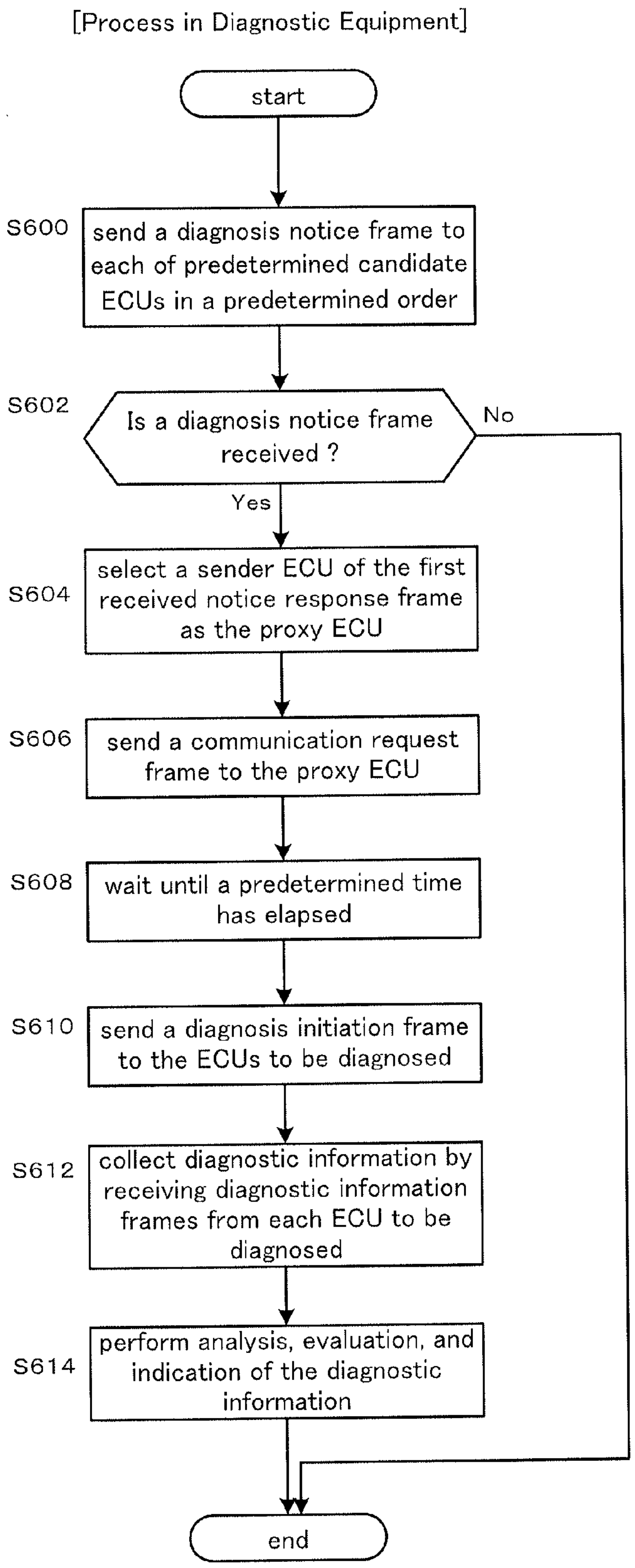
FIG. 12 shows a flow diagram of a process in the diagnostic equipment used in the vehicle diagnostic system according to the second embodiment.

FIG. 12 is a flow diagram illustrating a process in the diagnostic equipment 1102. The start condition (or the starting timing) of this process is the same as that of the process shown in FIG. 5 which is performed by the equipment 102.

At the beginning of the process, the information acquisition unit 1320 of the processing unit 1300 first transmits a diagnosis notice frame to each of the predetermined candidate ECUs 104 in the predetermined searching order (S600). For example, after transmitting a diagnosis notice frame to one candidate ECU 104, if a notice response frame is not received from the one candidate ECU 104 within a predetermined time period, then the unit 1320 may send a diagnosis notice frame to a next candidate ECU 104. In this way, the unit 3120 may repeats the transmission of a diagnosis notice frame and the confirmation of the reception of a diagnosis notice frame, with respect to each of the candidate ECUs 104, one after another.

When a notice response frame is received from any one of the candidate ECUs 104, the transmission of the diagnosis notice frames at the step S600 may stop and then the process may proceed to a step S602.

Then, the information acquisition unit 1320 determines whether a notice response frame is received from any one of the candidate ECUs 104 (S602). If a notice response frame is not received from any one of the candidate ECUs 104 (S602, No), the process terminates. Before the termination of the process, a predetermined error process may be performed. For example, error messages may be provided on the display unit 310 in the error process.

On the other hand, if a notice response frame is received from any one of the candidate ECUs 104 (S602, Yes), the equipment 1102 selects the candidate ECU 104 from which the equipment 1102 first receives a notice response frame, as the proxy ECU (S604).

The other steps S606 through S614 are the same as the steps S106 through S114 shown in FIG. 5, respectively. Therefore, the above descriptions about these steps S106 through S114 in FIG. 5 are incorporated here as the descriptions for the steps S606 through S614.

Figure 13:
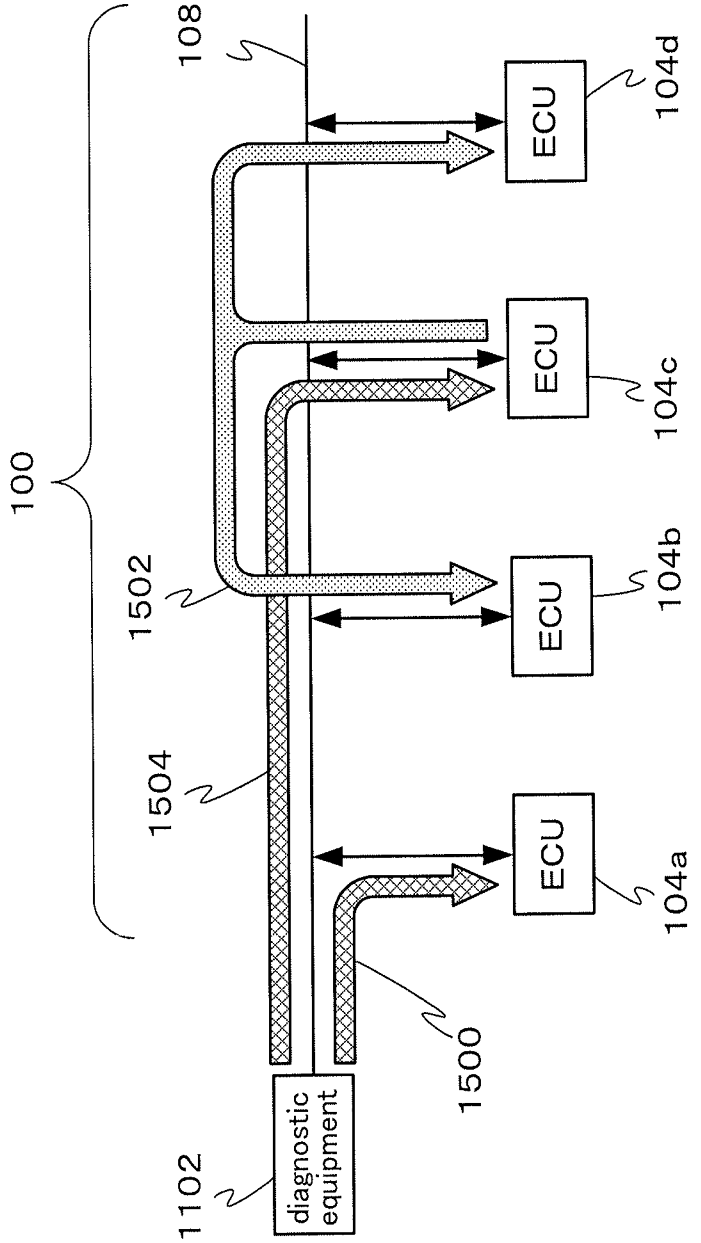
FIG. 13 illustrates an outline of operation of the vehicle diagnostic system according to the second embodiment.

Next, an overall flow of process in the diagnostic system 20 is described below according to a flow diagram shown in FIG. 14 with reference to FIG. 13. FIG. 13 illustrates an outline of operation of the diagnostic system 20 in this embodiment. In an example shown in FIG. 13, it is assumed that the ECUs 104*a* and 104 *c* are the candidate ECUs 104 and the predetermined searching order is ECU 104*a*, ECU 104*c*. These information are assumed to be stored in the processing unit 1300 of the diagnostic equipment 1102, in advance. And, in the example shown in FIG. 13, the ECU 104*a* is assumed to be failed and incapable of communication.

Figure 14:
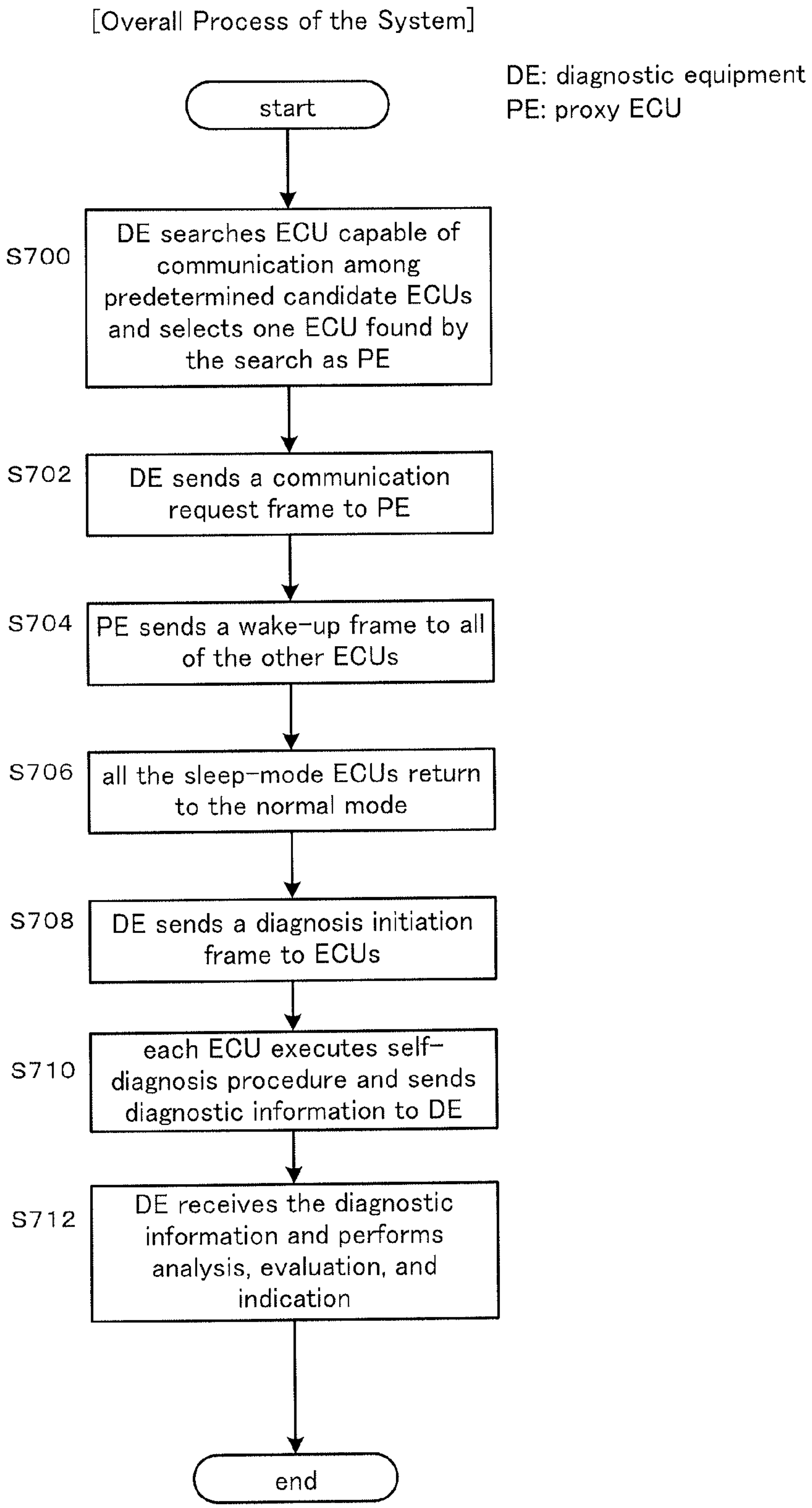
FIG. 14 shows a flow diagram of an overall process in the vehicle diagnostic system according to the second embodiment.

The overall process in the diagnostic system 20 shown in FIG. 14 starts at the time when the process (FIG. 12) in the equipment 1102 plugged in the bus 108 starts.

At the beginning of the process, the equipment 1102 searches one ECU 104 capable of communication among the candidate ECUs 104 in a predetermined searching order, and selects the one ECU 104 found by the search as the proxy ECU (S700) (which corresponds to the steps S600 through S604 in FIG. 12).

Specifically, in FIG. 13, the equipment 1102 first sends a diagnosis notice frame to the first candidate, ECU 104*a* (as expressed by an arrow 1500 in FIG. 13). However, the ECU 104*a* is failed and incapable of communication, so that the equipment 1102 does not receive a notice response frame from the ECU 104*a*. Then, the equipment 1102 sends a diagnosis notice frame to the next candidate, ECU 104*c* (as expressed by an arrow 1504 in FIG. 13), and the equipment 1102 receives a notice response frame from the ECU 104*c*. In this way, the equipment 1102 recognizes that the ECU 104*c* is capable of communication, and selects the ECU 104*c* as the proxy ECU.

And then, in FIG. 14, the equipment 1102 sends a communication request frame to the proxy ECU 104 (S702) (which corresponds to the step S606 in FIG. 12), and the proxy ECU 104 sends a wake-up frame to all of the ECUs 104 (S704) (which corresponds to the steps S400 through S404, S408, and S410 in FIG. 8).

Specifically, in FIG. 13, after a communication request frame is sent to the proxy ECU 104*c*, the proxy ECU 104*c* sends a wake-up frame to all of the other ECUs 104, and then, the wake-up frame is received by the ECU 104*b* and ECU 104*d*, as expressed by an arrow 1502 (the failed ECU 104*a* can not receive the wake-up frame). Consequently, all of the ECUs 104*b* through 104*d* other than the failed ECU 104*a* operate in the normal mode, and the equipment 1102 can obtain diagnostic information from all of the ECUs 104*b* through 104*d* other than the failed ECU 104*a*.

In FIG. 13, if the ECU 104*a* can not communicate with the equipment 1102 because the ECU 104*a* is just in the sleep mode, not failed, the wake-up frame sent from the ECU 104*c* would be also received by the ECU 104*a*, and the ECU 104*a* also would return to the normal mode. In this case, the equipment 1102 could obtain diagnostic information from all of the ECUs 104*a* through 104*d*.

Figure 9:
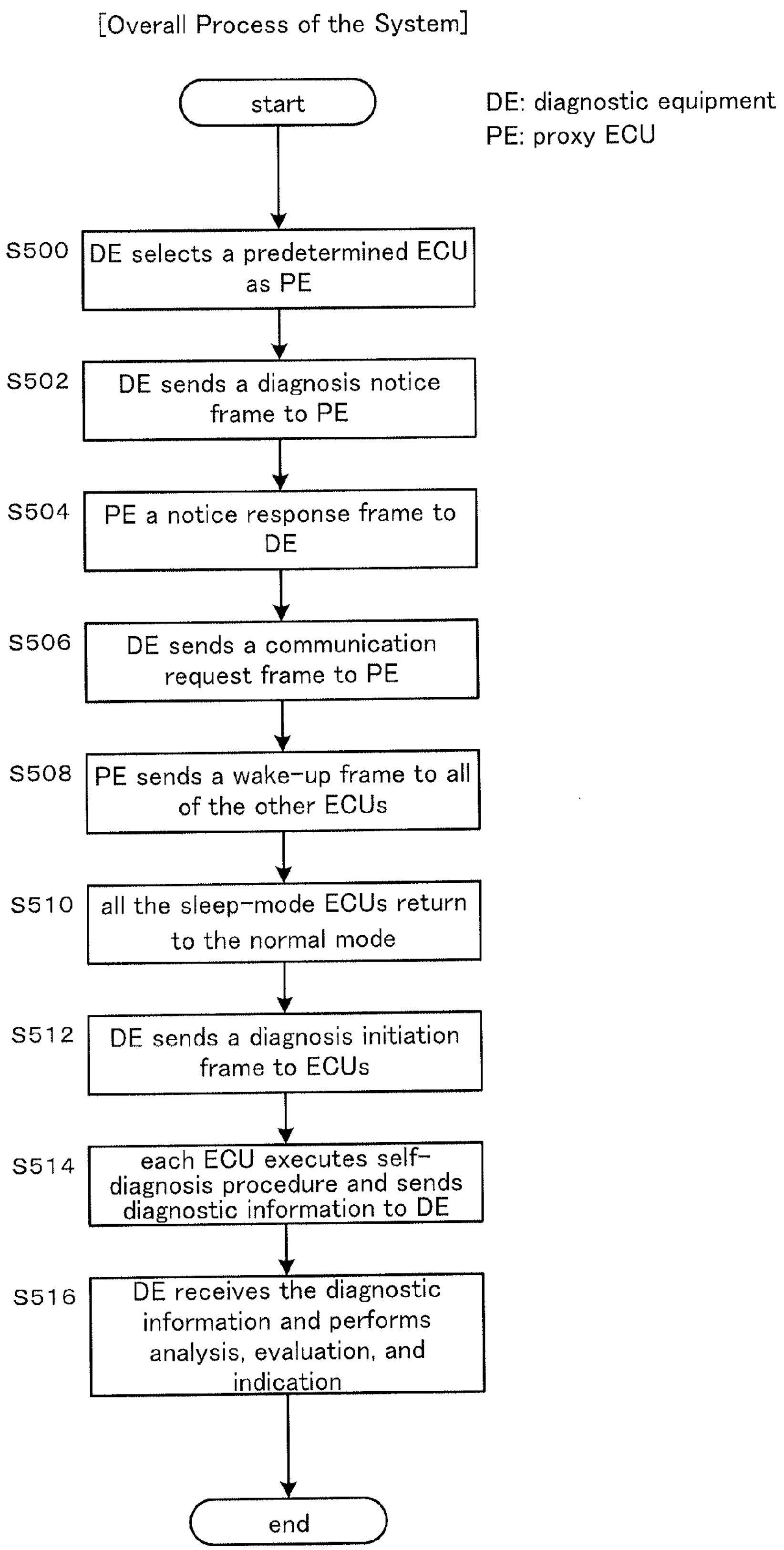
FIG. 9 shows a flow diagram of an overall process in the vehicle diagnostic system according to the first embodiment.

Steps S706 through S712 shown in FIG. 14 are the same as the steps S510 through S516 shown in FIG. 9, respectively. Therefore, the above descriptions regarding these steps S510 through S516 are incorporated here as the descriptions for the steps S706 through S712.

In this embodiment, the ECU 104 sends a wake-up frame to all the other ECUs 104 in response to receiving a communication request frame from the diagnostic equipment 1102. Alternatively, the ECU 104 may send a wake-up frame to all the other ECUs 104 just after sending a notice response frame to the equipment 1102 in response to receiving a diagnosis notice frame from the equipment 1102, without waiting for the reception of a communication request frame from the equipment 1102. In this case, one candidate ECU 104 capable of communication which receives a diagnosis notice frame first among the candidate ECUs 104 may become the proxy ECU by itself and sends a wake-up frame to all the other ECUs 104. Therefore, a transmission of the communication request frame from the equipment 1102 is not necessary, so that the process may be simplified and a turn-around time for collecting diagnostic information may be reduced.

<<Third Embodiment>>

Next, a vehicle diagnostic system according to a third embodiment of the present invention will be described.

In this system, one ECU is predetermined to be first selected as the proxy ECU and information about the predetermined one ECU is stores in a diagnostic equipment in advance. And, if the diagnostic equipment can communicate with the predetermined ECU, the equipment selects the predetermined ECU as the proxy ECU and collects diagnostic information. Otherwise, i.e., if the equipment can not communicate with the predetermined ECU, the equipment detects ECUs capable of communication among the other ECUs and selects one of the detected ECU as the proxy ECU.

In this embodiment, even if the one ECU predetermined to be first selected as the proxy ECU is failed, the equipment may select dynamically (or adaptively) one of the other ECUs capable of communication as the proxy ECU and returns sleep-mode ECUs to the normal mode through the proxy ECU. Thus, the reliability of the system operation may be improved.

Figure 15:
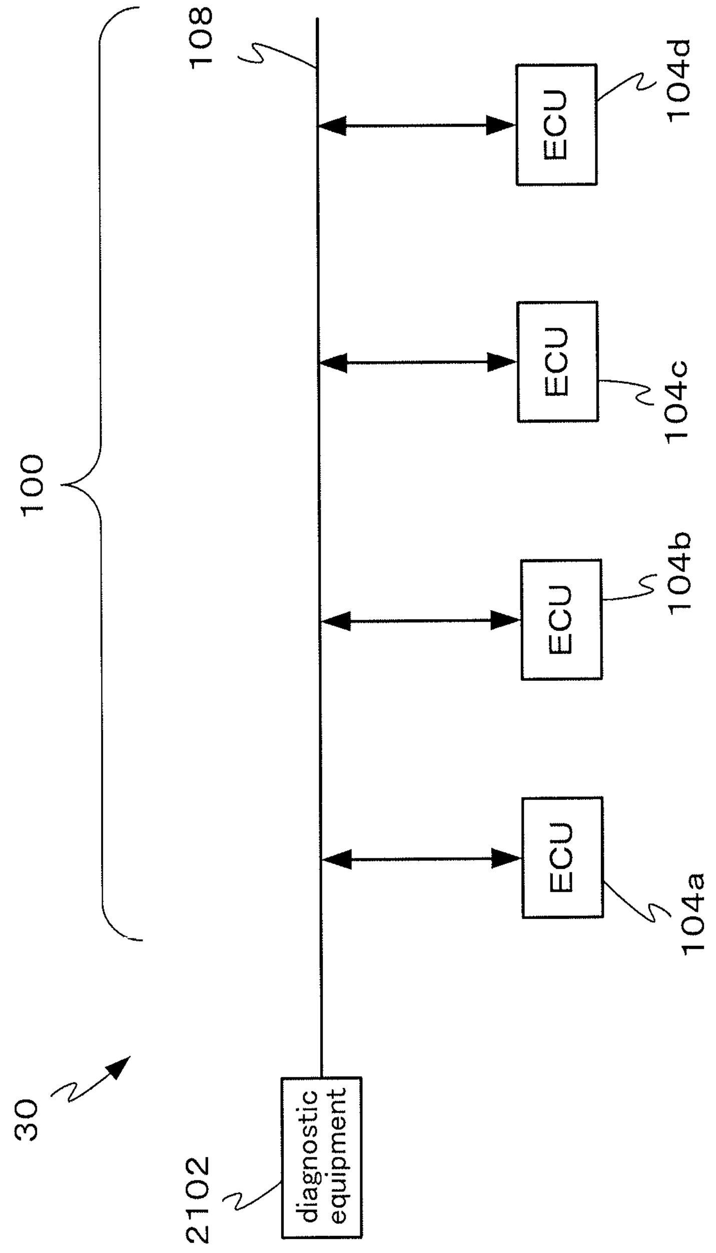
FIG. 15 illustrates a configuration of a vehicle diagnostic system according to a third embodiment of the present invention.

FIG. 15 illustrates a configuration of a vehicle diagnostic system according to the third embodiment of the present invention. The diagnostic system 30 has the same configuration as that of the system 10 according to the first embodiment with the exception of including a diagnostic equipment 2102 instead of the equipment 102. In FIG. 15, the elements identical with those in the system 10 according to the first embodiment shown in FIG. 1 are designated by the same reference numerals as those in FIG. 1. And, with respect to the elements designated by the same reference numerals as those in FIG. 1, the above descriptions about FIG. 1 are incorporated here.

Figure 16:
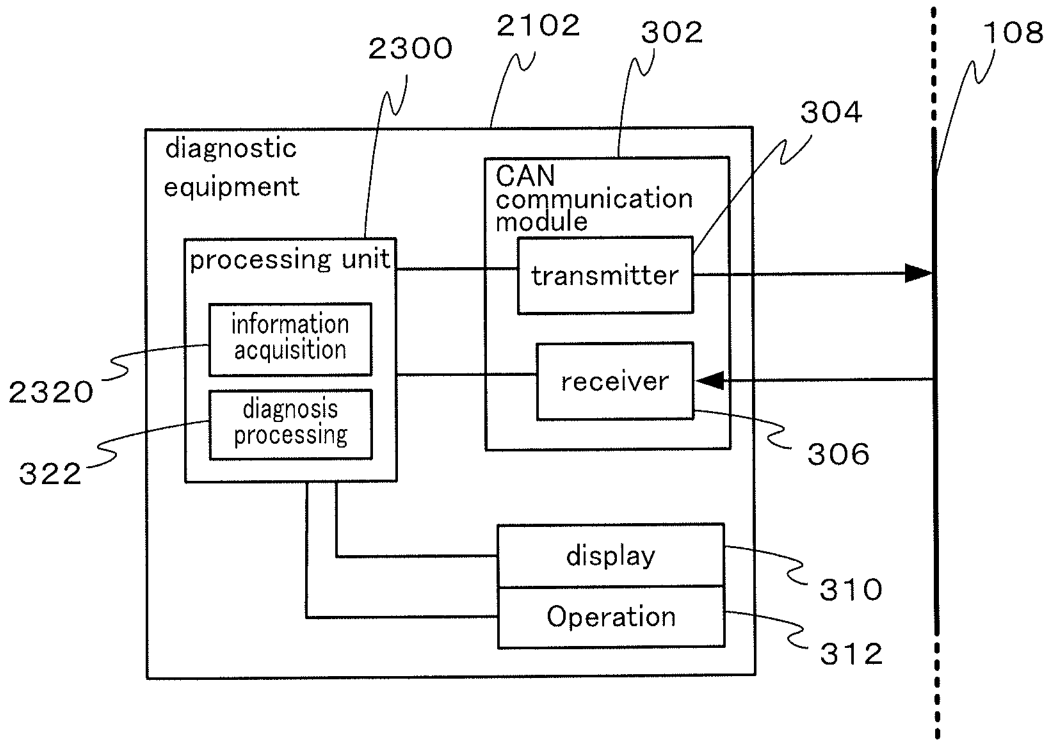
FIG. 16 illustrates a configuration of a diagnostic equipment used in the vehicle diagnostic system according to the third embodiment.

FIG. 16 is a block diagram illustrating a configuration of the diagnostic equipment 2102. The equipment 2102 has the same configuration as that of the equipment 102 according to the first embodiment with the exception of including a processing unit 2300 instead of the unit 300. In the FIG. 16, the elements identical with those shown in FIG. 3 are designated by the same reference numerals as those in FIG. 3. And, with respect to the elements designated by the same reference numerals as those in FIG. 3, the above descriptions about FIG. 3 are incorporated here.

The processing unit 2300 has the same configuration as that of the unit 300 with the exception of including an information acquisition unit 2320 instead of the unit 320. The unit 2320 is a virtual machine realized by the unit 2300 executing software programs as a computer.

The information acquisition unit 2320 has the same function as that of the unit 320 with the exception that the unit 2320 first selects a predetermined ECU 104 as the proxy ECU, and then, if the predetermined ECU is in a state incapable of communication, the unit 2320 detects ECUs capable of communication among the other ECUs and selects one of the detected ECUs as the proxy ECU.

Specifically, if the predetermined ECU 104 selected as the proxy ECU is in a state incapable of communication, the unit 2320 sends a diagnosis notice frame to all the other ECUs 104 and detects the ECUs 104 returning a notice response frame to the equipment 2102 as the ECUs 104 capable of communication. And then, the unit 2320 selects one of the detected ECUs 104 as the proxy ECU according to predetermined selection criterion (or criteria).

For example, the selection criterion may be defined like that: "according to a number preassigned to each of ECUs 104, one ECU 104 assigned the minimum number among the ECUs 104 capable of communication is selected as the proxy ECU". Here, the smaller number may be preassigned to a ECU 104 having the higher possibility of operating in the normal mode.

Figure 17:
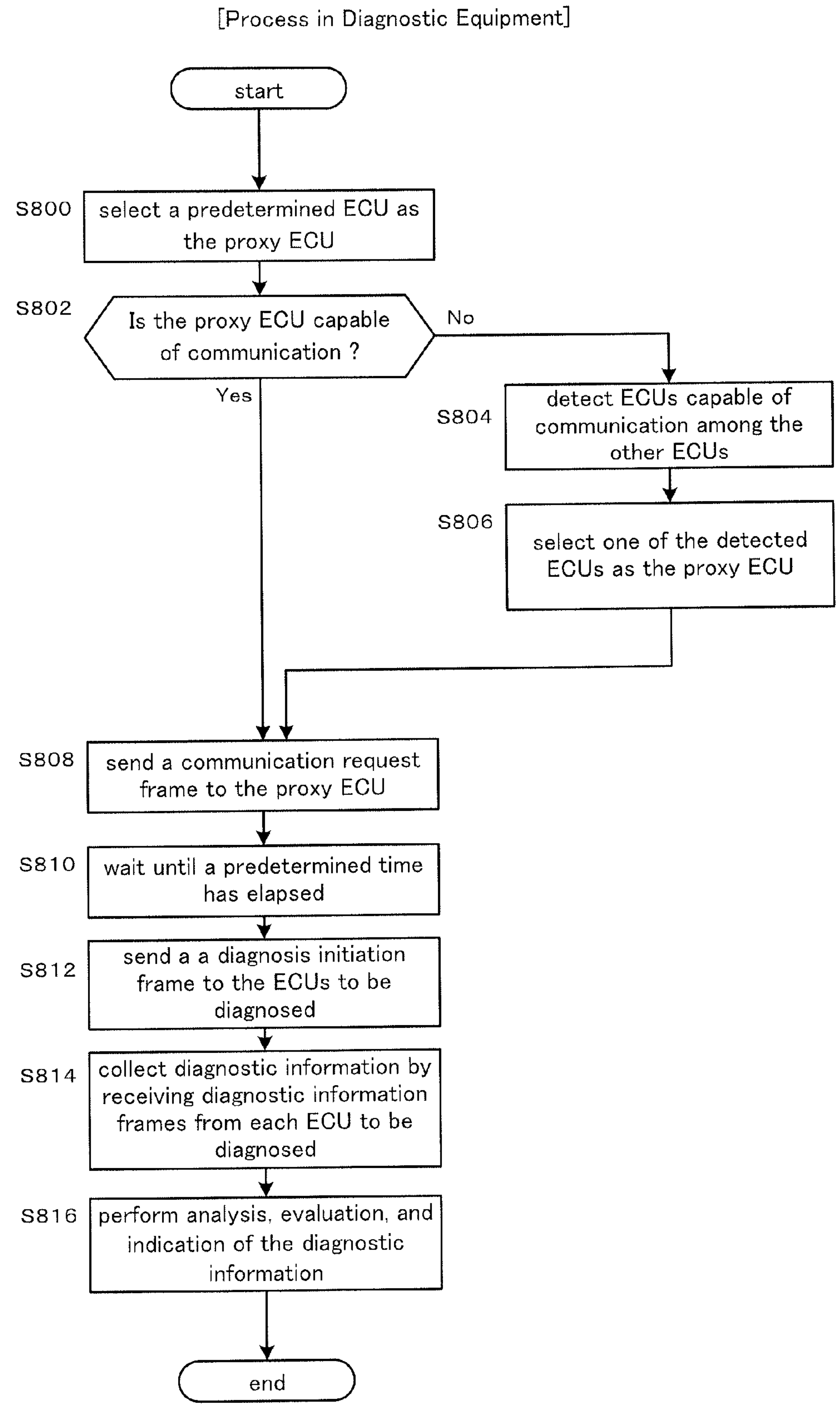
FIG. 17 shows a flow diagram of a process in the diagnostic equipment used in the vehicle diagnostic system according to the third embodiment.

FIG. 17 is a flow diagram illustrating a process in the diagnostic equipment 2102. The start condition (or the starting timing) of this process is similar to that of the process shown in FIG. 5 which is performed by the equipment 102.

At the beginning of the process, the information acquisition unit 2320 of the processing unit 2300 first selects a predetermined ECU 104 as the proxy ECU (S800), and determines whether the predetermined ECU 104 is in a state capable of communication (S802). Specifically, the unit 2320 sends a diagnosis notice frame to the predetermined ECU 104 and determines whether the predetermined ECU 104 is in a state capable of communication, based on whether the unit 2320 receives a notice response frame from the predetermined ECU 104 within a predetermined time period.

And then, if the proxy ECU 104 (i.e., the ECU 104 selected as the specific) is in a state capable of communication (S802, Yes), the process proceeds to a step S808. On the other hand, if the proxy ECU 104 is not in a state capable of communication (S802, No), the unit 2320 detects the ECUs 104 capable of communication among the other ECUs 104 (S804). Specifically, the unit 2320 sends a diagnosis notice frame to all the other ECUs 104 and may determine the ECUs 104 returning a notice response frame to the equipment 2102 as the ECUs 104 capable of communication.

Then, the unit 2320 selects one of the detected ECUs 104 capable of communication as the proxy ECU, in accordance with a predetermined selection criterion (S806). After that, the process proceeds to a step S808.

Steps S808 through S816 are the same as the steps S106 through S114 shown in FIG. 5, respectively. Therefore, the above descriptions about these steps S106 through S114 in FIG. 5 are incorporated here as the descriptions for the steps S808 through S816.

Figure 18:
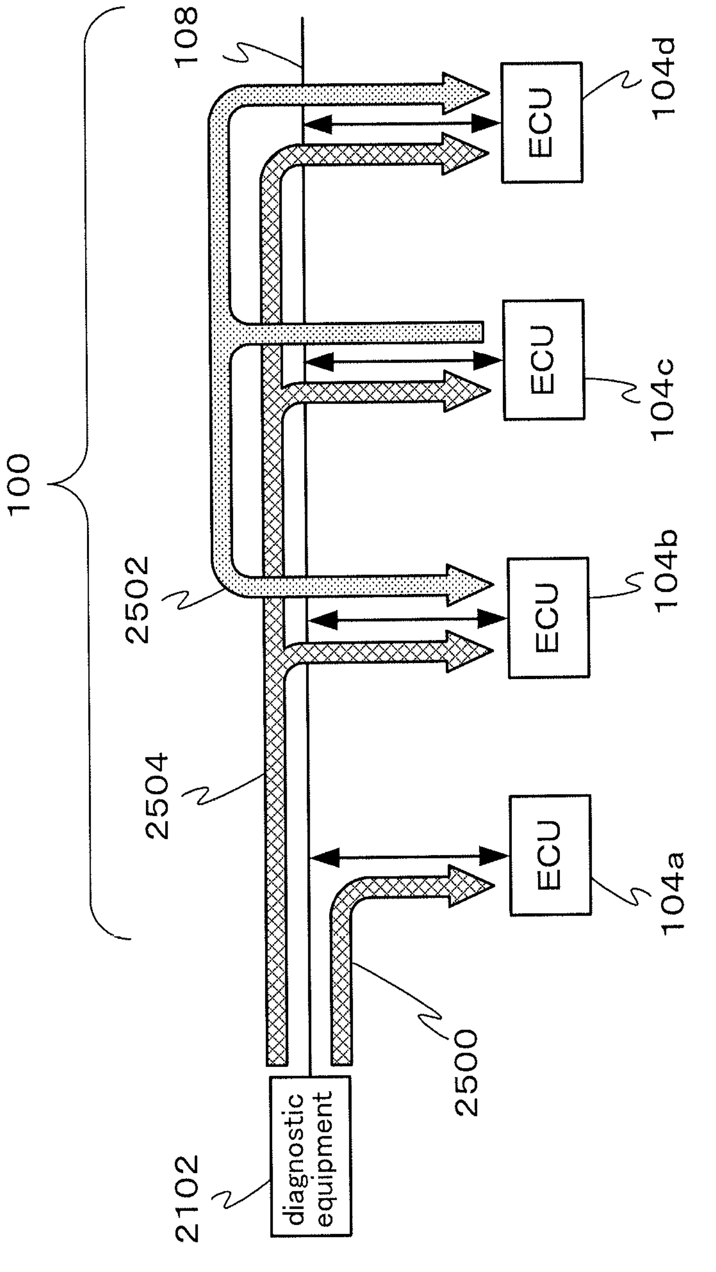
FIG. 18 illustrates an outline of operation of the vehicle diagnostic system according to the third embodiment.

Next, an overall flow of process in the diagnostic system 30 is described below according to a flow diagram shown in FIG. 19 with reference to FIG. 18. FIG. 18 illustrates an outline of operation of the diagnostic system 30 according to this embodiment. In an example shown in FIG. 18, it is assumed that the ECU 104*a* is predetermined to be first selected as the proxy ECU and information about the predetermined ECU 104*a* are stored in the diagnostic equipment 2102 in advance.

The ECUs 104*b*, 104*c*, and 104*d* are assumed to be preassigned the numbers 1, 2, and 3, respectively. The selection criterion are assumed to be predefined like that: "one ECU preassigned the minimum number among the ECUs currently capable of communication is selected as the proxy ECU". And the criterion is assumed to be described in the program to be executed by the processing unit 2300.

Further, the ECU 104*a* is assumed to be incapable of communication due to some operation failure, the ECU 104*b* is assumed to be in the sleep mode, and the ECUs 104*c* and 104*d* are assumed to be in the normal mode.

Figure 19:
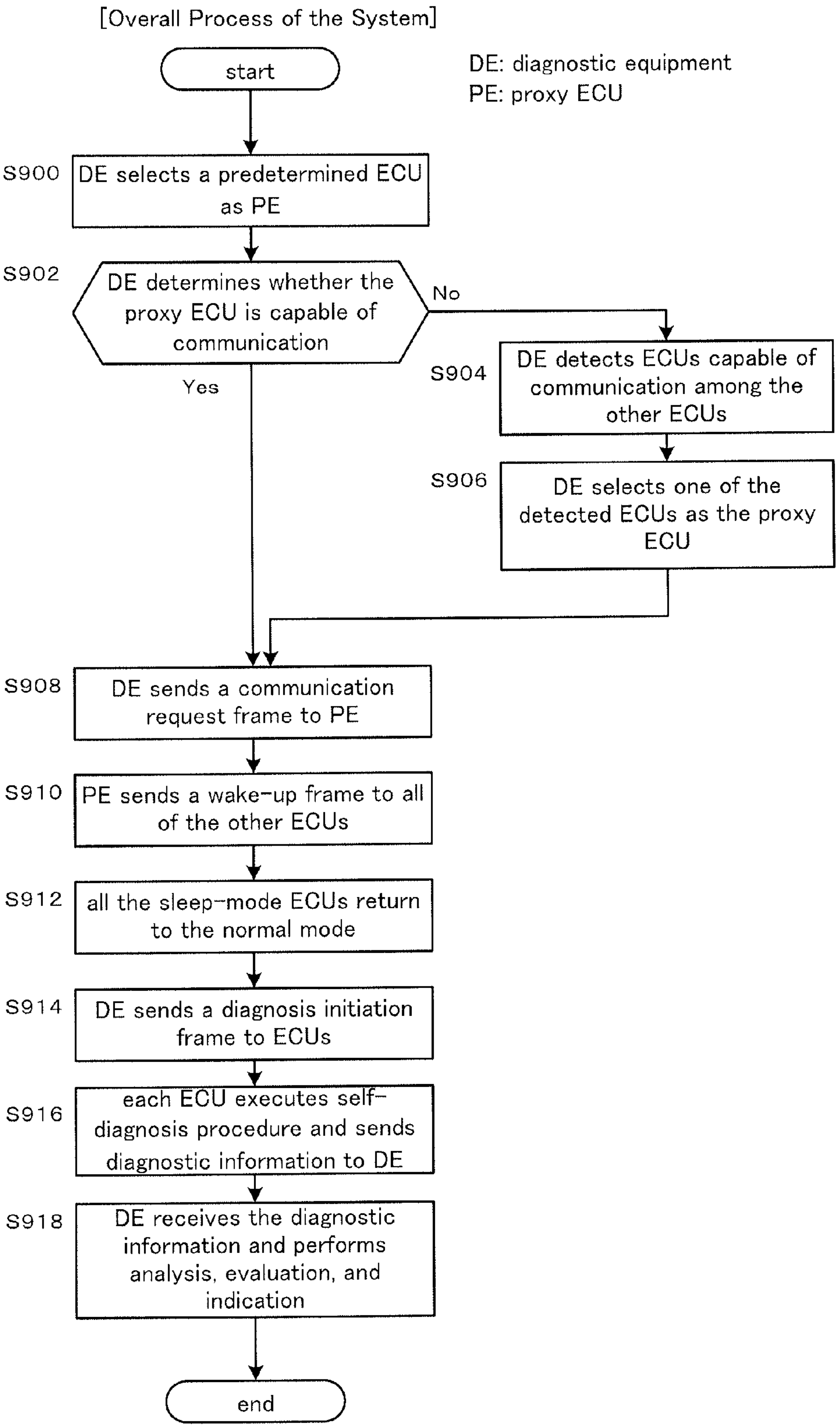
FIG. 19 shows a flow diagram of an overall process in the vehicle diagnostic system according to the third embodiment.

The overall process of the diagnostic system 30 shown in FIG. 19 starts at the time when the process (FIG. 17) in the equipment 2102 plugged in the bus 108 starts.

At the beginning of the process, the equipment 2102 first selects a predetermined ECU 104 as the proxy ECU (S900)

(which corresponds to the step S800 in FIG. 17), and determines whether the predetermined ECU 104 is in a state capable of communication (S902) (which corresponds to the step S802 in FIG. 17).

Specifically, as expressed by an arrow 2500 in FIG. 18, the diagnostic equipment 2102 sends a diagnosis notice frame to the predetermined ECU 104, i.e., ECU 104*a*. As described above, the ECU 104*a* in FIG. 18 is failed and incapable of communication, so that the equipment 2102 can not receive a notice response frame within a predetermined time period from the ECU 104*a*. Thus, the equipment 2102 determines that the ECU 104*a* is incapable of communication.

Then, in FIG. 19, if the ECU 104 selected as the proxy ECU is capable of communication (S902, Yes), the process proceeds to a step S908. On the other hand, if the proxy ECU 104 is incapable of communication (S902, No), the equipment 2102 detects the ECUs 104 capable of communication among the other ECUs 104 (S904) (which corresponds to the step S804 in FIG. 17).

Specifically, as expressed by an arrow 2504 in FIG. 18, the equipment 2102 sends a diagnosis notice frame to all the other ECUs 104*b* through 104*d*, and detects the ECUs 104 returning a notice response frame within a predetermined time period as the ECUs capable of communication. More specifically, the equipment 2102 detects the ECUs 104*c* and 104*d* each returning a notice response frame as the ECUs 104 capable of communication, because the sleep-mode ECU 104*b* does not send a notice response frame while the normal-mode ECUs 104*c* and 104*d* sends a notice response frame.

Then, in FIG. 19, the equipment 2102 selects one of the detected ECU 104 capable of communication as the proxy ECU in accordance with a predetermined selection criterion (S906) (which corresponds to the step S806 in FIG. 17). After that, the process proceeds to a step S908.

And, the equipment 2102 sends a communication request frame to the proxy ECU 104, i.e., the ECU 104 selected as the proxy ECU (S908) (which corresponds to the step S808 in FIG. 17). Then, the proxy ECU 104 sends a wake-up frame to all the other ECUs 104 (S910) (which corresponds to the steps S400 through S404, S408, S410 in FIG. 8).

Specifically, in the example shown in FIG. 18, the equipment 2102 selects as the proxy ECU the ECU 104*c* which is preassigned the minimum number "2" among the ECUs 104*c* and 104*d* detected as the ECUs 104 capable of communication. And the equipment 2102 sends a communication request frame to the ECU 104*c*, and the ECU 104*c* sends a wake-up frame to all the other ECUs 104.

And then, the wake-up frame sent from the ECU 104*c* is received by the ECUs 104*b* and 104*d* (while the wake-up frame is not received by the failed ECU 104*a*), as expressed by an arrow 2502. Consequently, all the ECUs 104 except for the failed ECU 104*a*, that is, ECUs 104*b* through 104*d*, are in a state capable of communication, so that the diagnostic equipment 2102 can collect diagnostic information from the ECUs 104*b* through 104*d*.

In FIG. 18, if the ECU 104*a* can not communicate with the equipment 2102 because the ECU 104*a* is just in the sleep mode, not failed, the wake-up frame sent from the ECU 104*c* would be also received by the ECU 104*a*, and the ECU 104*a* also would return to the normal mode. In this case, the equipment 2102 could obtain diagnostic information from all of the ECUs 104*a* through 104*d*.

Steps S912 through S918 shown in FIG. 19 are the same as the steps S510 through S516 shown in FIG. 9, respectively. Therefore, the above descriptions regarding these steps S510 through S516 in FIG. 9 are incorporated here as the descriptions for the steps S912 through S918.

In this embodiment, only if the predetermined ECU to be first selected as the proxy ECU is incapable of communication, the equipment 2102 detects the ECUs 104 capable of communication among the other ECUs 104, and selects one of the detected ECUs 104 as the proxy ECU. Alternatively, the ECU to be first selected as the proxy ECU may not be predetermined. In this case, the equipment 2102 may detect the ECUs 104 capable of communication among all of the ECUs 104, in a similar way to that described above, and then the equipment 2102 may select one of the detected ECUs 104 as the proxy ECU.

When one specific ECU 104 is predetermined to be first selected as the proxy ECU, as is the case in this embodiment, the prior knowledge about the situations where the predetermined ECU 104 operates in the normal mode (in a state capable of communication) may be available, such as "just after an ignition switch turns ON". Therefore, if the process for the diagnosis (i.e., the process shown in FIG. 17 or FIG. 19) is to be started only in a predetermined situation (s) according to the prior knowledge, the predetermined ECU 104 is ensured to operate in the normal mode at the start of the process as far as the predetermined ECU operates normally, so that there is no need to select one ECU 104 other than the predetermined ECU 104 as the proxy ECU. Consequently, the turn-around time for collecting diagnostic information may be reduced.

In this embodiment, the equipment 2102 selects one of the ECUs 104 capable of communication in accordance with the predetermined selection criterion. Alternatively, the equipment 2102 may select one of the ECUs 104 capable of communication, arbitrarily or based on certain criteria given by other equipment through an appropriate communication means.

The second embodiment described above can be considered as a special case of the third embodiment where the selection criterion is predefined like that: "searching the ECUs capable of communication in a predetermined order, one ECU 104 found first is selected as the proxy ECU".

<<Fourth Embodiment>>

Next, a vehicle diagnostic system according to a fourth embodiment of the present invention will be described.

In this system, a plurality of ECUs are predetermined as candidates of the proxy ECU and information about the candidates are stored in a diagnostic equipment in advance. The diagnostic equipment sends a communication request frame to all of the predetermined candidate ECUs. Each of the candidate ECUs watches for a wake-up frame to be sent out on the bus over a predetermined observation time period after receiving the communication request frame.

Each of the candidate ECUs is preset a different length of the observation time from each other. Each candidate ECU sends out a wake-up frame to all of the other ECUs if a wake-up frame is not sent out on the bus within a period of the observation time set to its own ECU. This means that one candidate ECU having the minimum observation time among the candidate ECUs capable of communication becomes the proxy ECU by itself and sends a wake-up frame to the other ECUs.

In this embodiment, one of the predetermined candidate ECUs becomes the proxy ECU by itself, without a diagnostic equipment selecting an ECU as the proxy ECU. Therefore, the process may be simplified and a turn-around time for collecting diagnostic information may be reduced.

Figure 20:
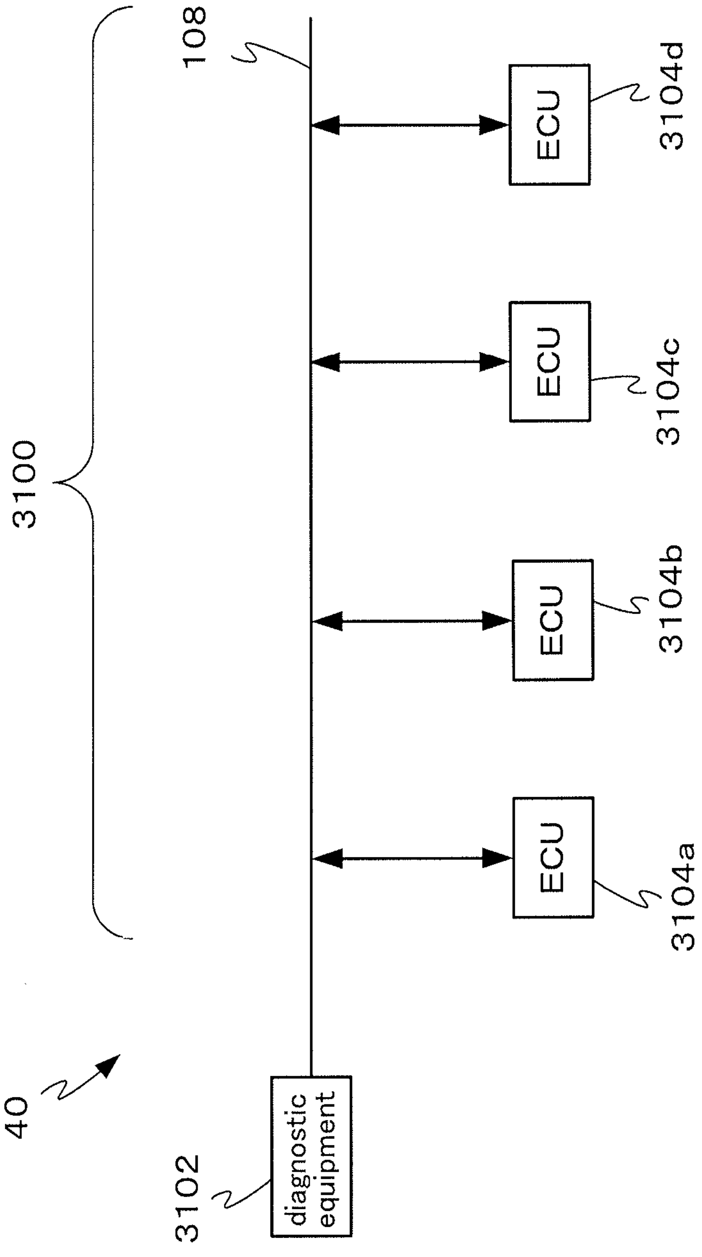
FIG. 20 illustrates a configuration of a vehicle diagnostic system according to a fourth embodiment of the present invention.

FIG. 20 illustrates a configuration of a vehicle diagnostic system according to the fourth embodiment of the present invention.

The diagnostic system 40 includes an in-vehicle network 3100 in which a plurality of ECUs 3104*a* through 3104*d* are connected communicatively with each other through a bus 108, and a diagnostic equipment 3102 plugged into the network 3100. In FIG. 20, the elements identical with those in the system 10 according to the first embodiment shown in FIG. 1 are designated by the same reference numerals as those in FIG. 1. And, with respect to the elements designated by the same reference numerals as those in FIG. 1, the above descriptions about FIG. 1 are incorporated here.

Figure 21:
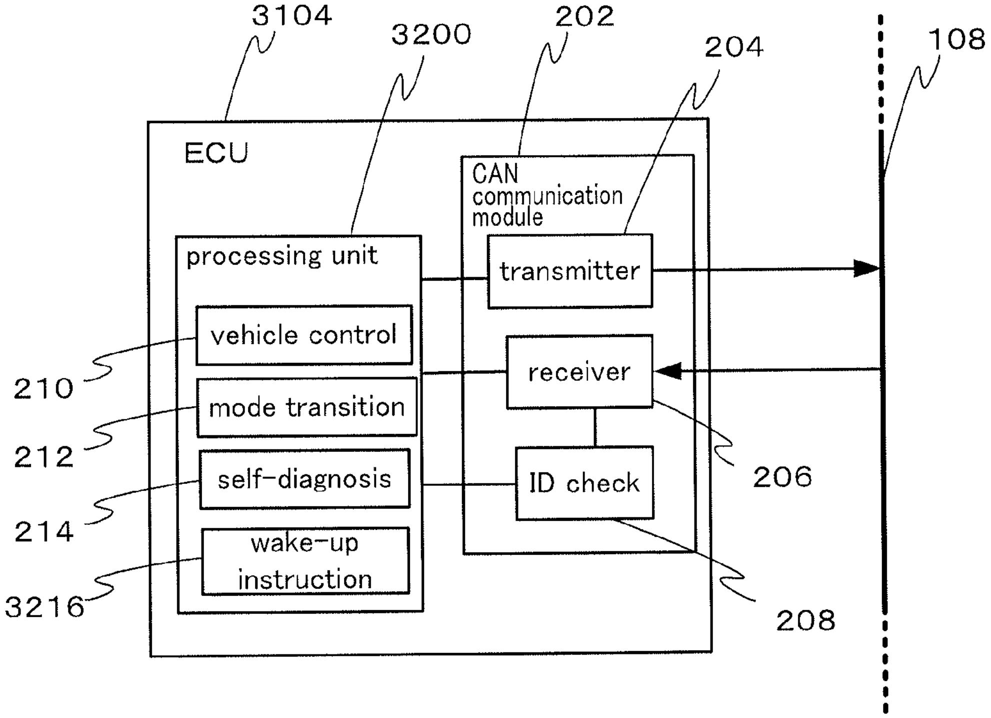
FIG. 21 illustrates a configuration of an ECU used in the vehicle diagnostic system according to the fourth embodiment.

FIG. 21 is a block diagram illustrating a configuration of the ECU 3104. The ECU 3104 has the same configuration as that of the ECU 104 according to the first embodiment with the exception of including a processing unit 3200 instead of the unit 200. In the FIG. 21, the elements identical with those in ECU 104 according to the first embodiment shown in FIG. 2 are designated by the same reference numerals as those in FIG. 2. And, with respect to the elements designated by the same reference numerals as those in FIG. 2, the above descriptions about FIG. 2 are incorporated here.

The processing unit 3200 has the same configuration as that of the unit 200 of the ECU 104 according to the first embodiment with the exception that the unit 3200 includes a wake-up instruction unit 3216 instead of the unit 216 and an observation time for watching for a frame to be sent out on the bus 108 after receiving a communication request frame is predetermined and stored in a storage unit (not shown) of the unit 3200. Here, the observation time is predetermined to have a different length of time for each of ECUs 3104. The observation time may be stored in the storage unit in advance, or may be described in the program to be executed by the unit 3200 and stored (or downloaded) in the storage unit at a time when the ECU 3104 starts up.

The wake-up instruction unit 3216 is a virtual machine realized by the unit 3200 executing software programs as a computer. Alternatively, the unit 3216 may be realized with hardware.

The wake-up instruction unit 3216 has the same configuration as that of the unit 216 according to the first embodiment with the exception that, if a frame provided from the receiver 206 is a communication request frame, the unit 3216 first watches for a wake-up frame to be sent out on the bus 108 within the predetermined observation time period, before sending out a wake-up frame from itself.

Specifically, the unit 3216 receives a frame sent out on the bus 108, through the receiver 206, and determines whether the received frame is a wake-up frame, by checking an ID number, a data length, and/or data contents of the received frame. Here, the wake-up frame is sent to all the ECUs 3104. Thus, once a wake-up frame is sent out on the bus 108, every ECU 3104 can detect the wake-up frame being sent out.

And, if a wake-up frame sent out on the bus 108 is detected within the predetermined observation time period after receiving the communication request frame, the unit 3216 terminates this observation operation (i.e., the operation of waiting for a wake-up frame) without sending a wake-up frame from itself. On the other hand, if a wake-up frame is not sent out on the bus within the predetermined time period, the unit 3216 terminates the observation operation and sends out a wake-up frame to all of the ECUs 3104 from itself.

Figure 22:
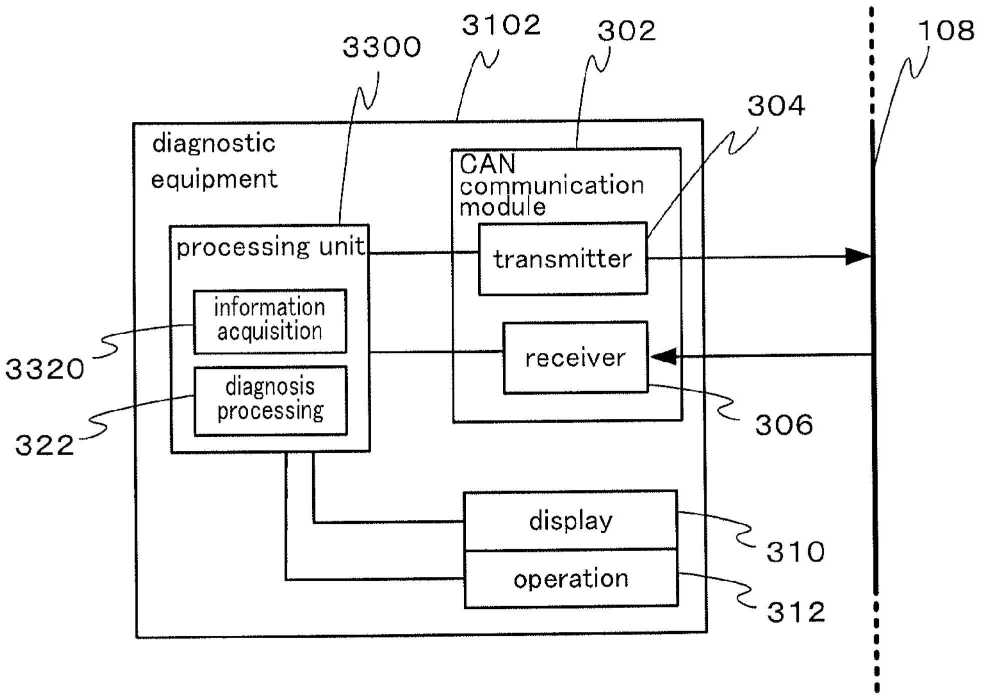
FIG. 22 illustrates a configuration of a diagnostic equipment used in the vehicle diagnostic system according to the fourth embodiment.

FIG. 22 is a block diagram illustrating a configuration of the diagnostic equipment 3102. The equipment 3102 has the same configuration as that of the equipment 102 according to the first embodiment with the exception of including a processing unit 3300 instead of the unit 300. In the FIG. 22, the elements identical with those of the equipment 102 according to the first embodiment shown in FIG. 3 are designated by the same reference numerals as those in FIG. 3. And, with respect to the elements designated by the same reference numerals as those in FIG. 3, the above descriptions about FIG. 3 are incorporated here.

The processing unit 3300 has the same configuration as that of the unit 300 according to the first embodiment with the exception of including an information acquisition unit 3320 instead of the unit 320. The unit 3320 is a virtual machine realized by the unit 3300 executing software programs as a computer.

The information acquisition unit 3320 has the same configuration as that of the unit 320 according to the first embodiment with the exception that the unit 3320 sends a communication request frame to all of the ECUs 3104 (hereinafter referred to as "candidate ECU 3104") predetermined as candidates of the proxy ECU simultaneously, without sending a diagnosis notice frame.

Next, a flow of process in the diagnostic equipment 3102 and that in the ECU 3104 will be described.

<<Process in the Diagnosis Equipment 3102>>

First, a flow of a process in the diagnostic equipment 3102 is described with reference to a flow diagram shown in FIG. 23. This process starts e.g., automatically at the time when the equipment 3102 is plugged into the bus 108 during the ignition switch ON, or the process starts by a user inputting any start command through the operation unit 312 of the equipment 3102 after connecting the equipment 3102 to the bus 108. Desirably, the plugging of the equipment 3102 or the input of the start command is performed after a user have confirmed that any one of the candidate ECUs 3104 is in a state capable of communication. Here, the equipment 3102 is assumed to be powered on before the plugging or the command input.

At the beginning of the process, the information acquisition unit 3320 of the processing unit 3300 first sends a communication request frame to all of the predetermined candidate ECUs 3104 simultaneously (S1000), and waits until a predetermined time has elapsed (S1002). After that, the process proceeds to a step S1004. Here, the predetermined time may be a time necessary and sufficient for the all of the sleep-mode ECUs 3104 to return to the normal mode in a case where the ECU 3104 having the longest observation time is selected as the proxy ECU.

Steps S1004 through S1008 are the same as the steps S110 through S114 shown in FIG. 5, respectively. Therefore, the above descriptions about these steps S110 through S114 in FIG. 5 are incorporated here as the descriptions for the steps S1004 through S1008.

<<Process in the ECU 3104>>

Next, a flow of process in the ECU 3104 will be described. The ECU 3104 performs a mode transition process, a mode restoration process, and a diagnosis-related process. The mode transition process is a process for setting its own ECU 3104 to the sleep mode when a predetermined condition is met, the mode restoration process is a process for restoring its own ECU 3104 to the normal mode after receiving the wake-up frame during the sleep mode, and the diagnosis-related process is a process related to diagnosis of the host vehicle.

The mode transition process and the mode restoration process in the ECU 3104 are the same as those in the ECU 104 according to the first embodiment, described with reference to FIG. 6 and FIG. 7, respectively. Thus, with respect to the mode transition process and the mode restoration process in the ECU 3104, the above descriptions regarding those processes shown in FIGS. 6 and 7 are incorporated here as the descriptions for those process in the ECU 3104.

<Diagnosis-related Process>

Next, a flow of the diagnosis-related process in the ECU 3104 is described with reference to a flow diagram shown in FIG. 24.

This process may start at the time when the ECU 3104 starts the normal mode operation, and may be executed in parallel with other processes performed in the normal mode. The normal mode operation starts, for example, at the time when the ECU 3104 is powered on by turning on the ignition switch or when the ECU 3104 returns from the sleep mode to the normal mode.

This process is the same as that in the ECU 104 according to the first embodiment shown in FIG. 8 with the exception of not including steps corresponding to the step S404 and S406, because a diagnosis notice frame is not sent from the diagnostic equipment 3102. And, in this process, after receiving a communication request frame, steps S1106 and S1108 are performed instead of the step S410 in FIG. 8.

Specifically, at a step S1104, whether a frame received from the bus 108 is a communication request frame is determined. If the frame received from the bus 108 is a communication request frame (S1104, Yes), the wake-up instruction unit 3216 determines whether a wake-up frame is received within a predetermined observation time period after receiving the communication request frame (S1106).

And, if a wake-up frame is received within the predetermined observation time period (S1106, Yes), the process returns to the step S1100 and repeat these steps. On the other hand, if a wake-up frame is not received within the predetermined observation time period (S1106, No), the unit 3216 sends a wake-up frame to all of the other ECUs 3104 immediately (S1108), and the process returns to the step S1100 and repeat these steps.

Steps S1100 through S1104, and S1110 through S1116 are the same as the steps S400, S402, S408, S412 through S418 shown in FIG. 8, respectively. Therefore, the above descriptions regarding these steps in FIG. 8 are incorporated here as the descriptions for those step in FIG. 24. The process shown in FIG. 24 terminates when the normal mode operation of its own ECU 3104 terminates. The normal mode operation may terminate when its own ECU 3104 is powered off by turning off the ignition switch or when the mode transition unit 212 sets its own ECU 3104 to the sleep mode, for example.

<<Overall Process of the System 40>>

Figure 25:
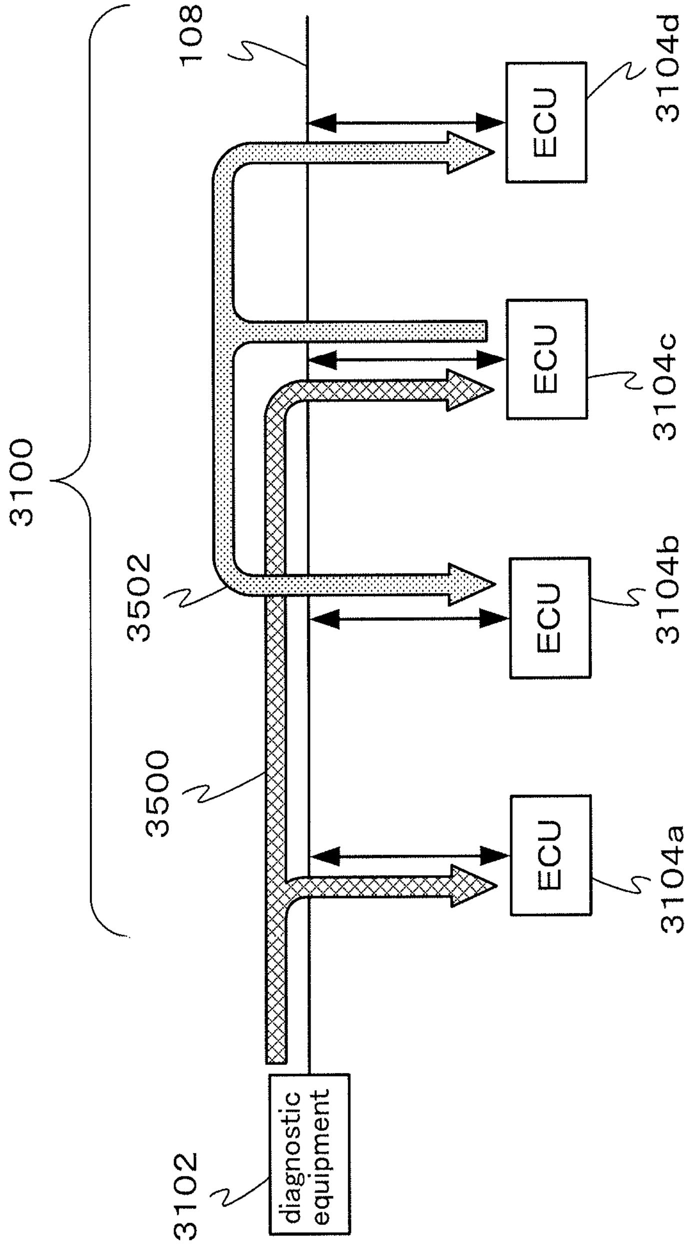
FIG. 25 illustrates an outline of operation of the vehicle diagnostic system according to the fourth embodiment.

Next, an overall flow of process in the diagnostic system 40 is described below according to a flow diagram shown in FIG. 26 with reference to FIG. 25. FIG. 25 illustrates an outline of operation of the diagnostic system 20 according to this embodiment. In an example shown in FIG. 25, it is assumed that the ECUs 3104*a* and 3104 *c* are predetermined as candidates of the proxy ECU and the information about the candidates are stored in the equipment 3102. And, the observation times of the ECU 3104*a* and 3104*c* are assumed to be preset to 1 second and 2 seconds, respectively, and to be stored in advance in the units 3200 of the ECU 3104*a* and the ECU 3104*c*, respectively. Further, the ECU 3104*a* is assumed to be failed and incapable of communication.

Figure 26:
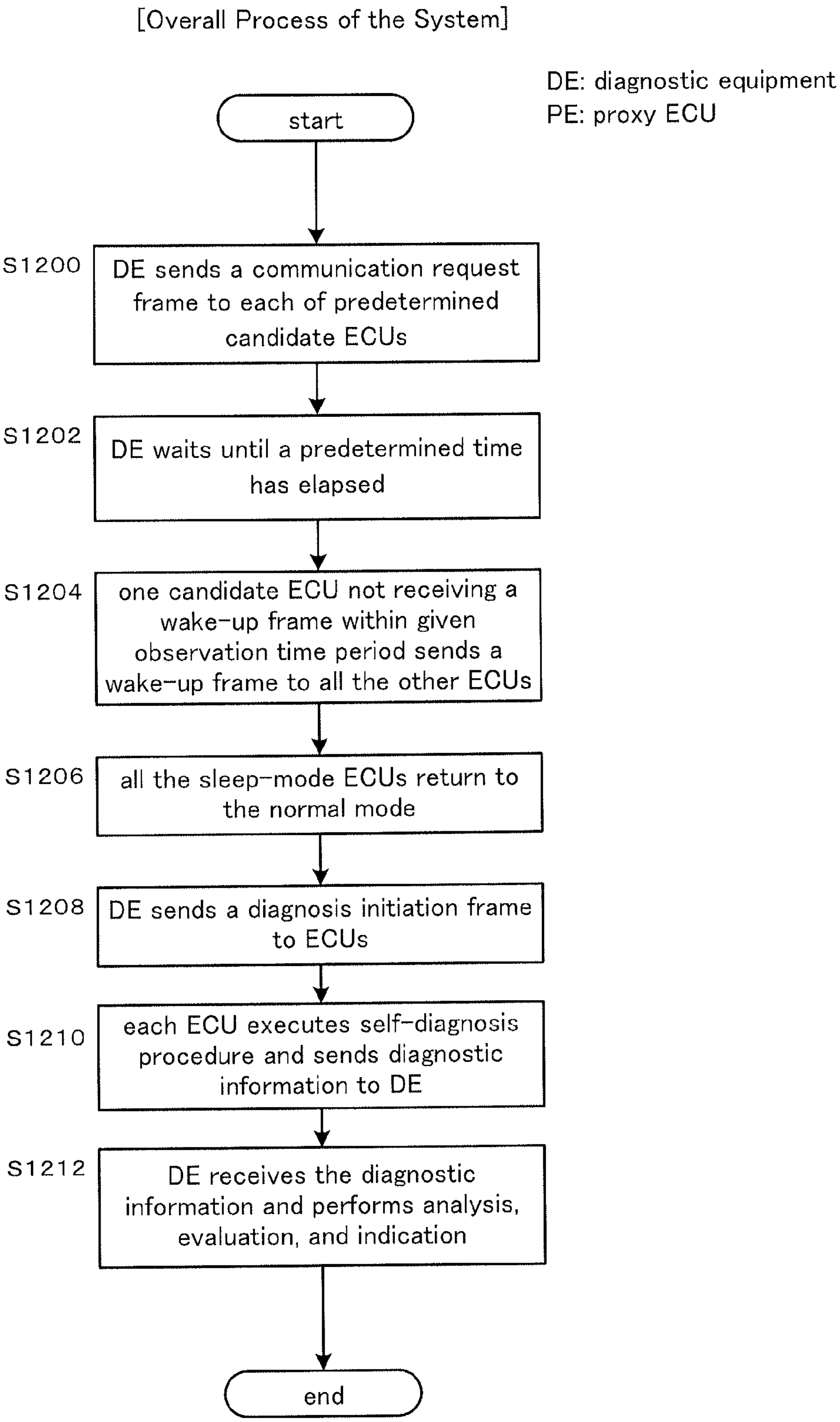
FIG. 26 shows a flow diagram of an overall process in the vehicle diagnostic system according to the fourth embodiment.

The process of the diagnostic system 40 shown in FIG. 26 starts at the time when the process (FIG. 23) in the equipment 3102 plugged into the bus 108 starts.

Figure 23:
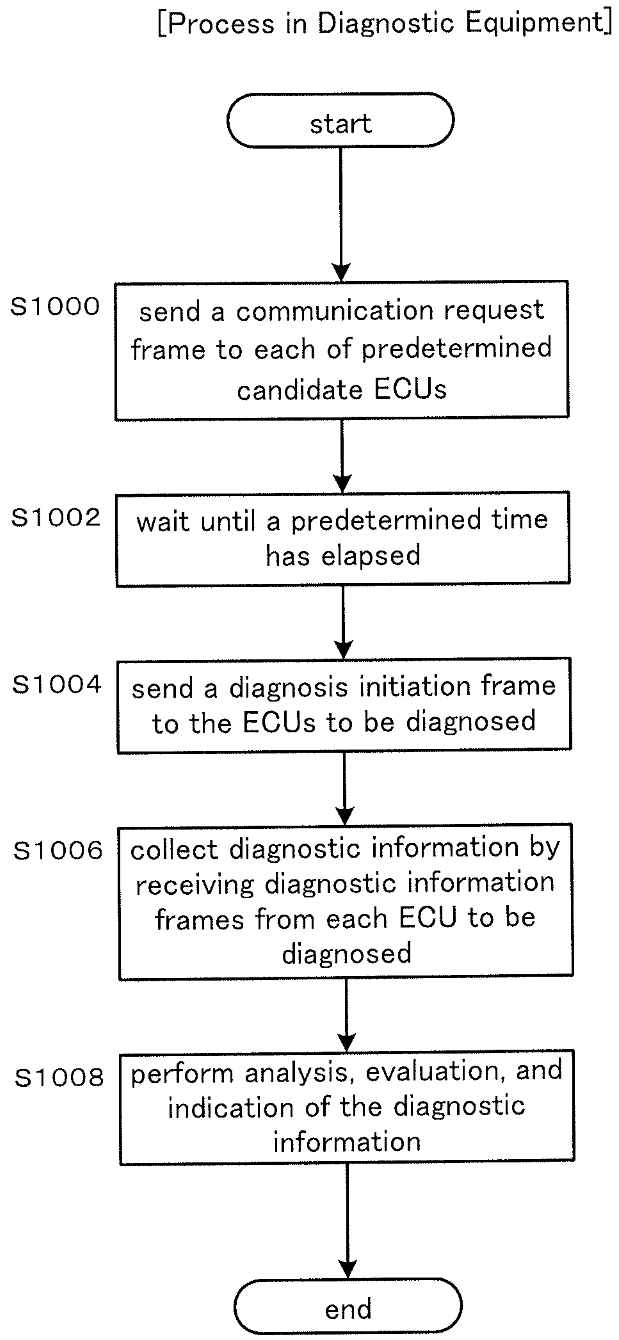
FIG. 23 shows a flow diagram of a process in the diagnostic equipment used in the vehicle diagnostic system according to the fourth embodiment.

At the beginning of the process, the equipment 3102 sends a communication request frame to all of the ECUs 3104 (i.e., the candidate ECUs 3104) predetermined as the candidates of the proxy ECU simultaneously (S1200) (which corresponds to the step S1000 in FIG. 23).

Specifically, as expressed by an arrow 3500 in FIG. 25, the equipment 3102 sends a communication request frame to the predetermined candidate ECUs 3104*a* and 3104*c*.

Figure 24:
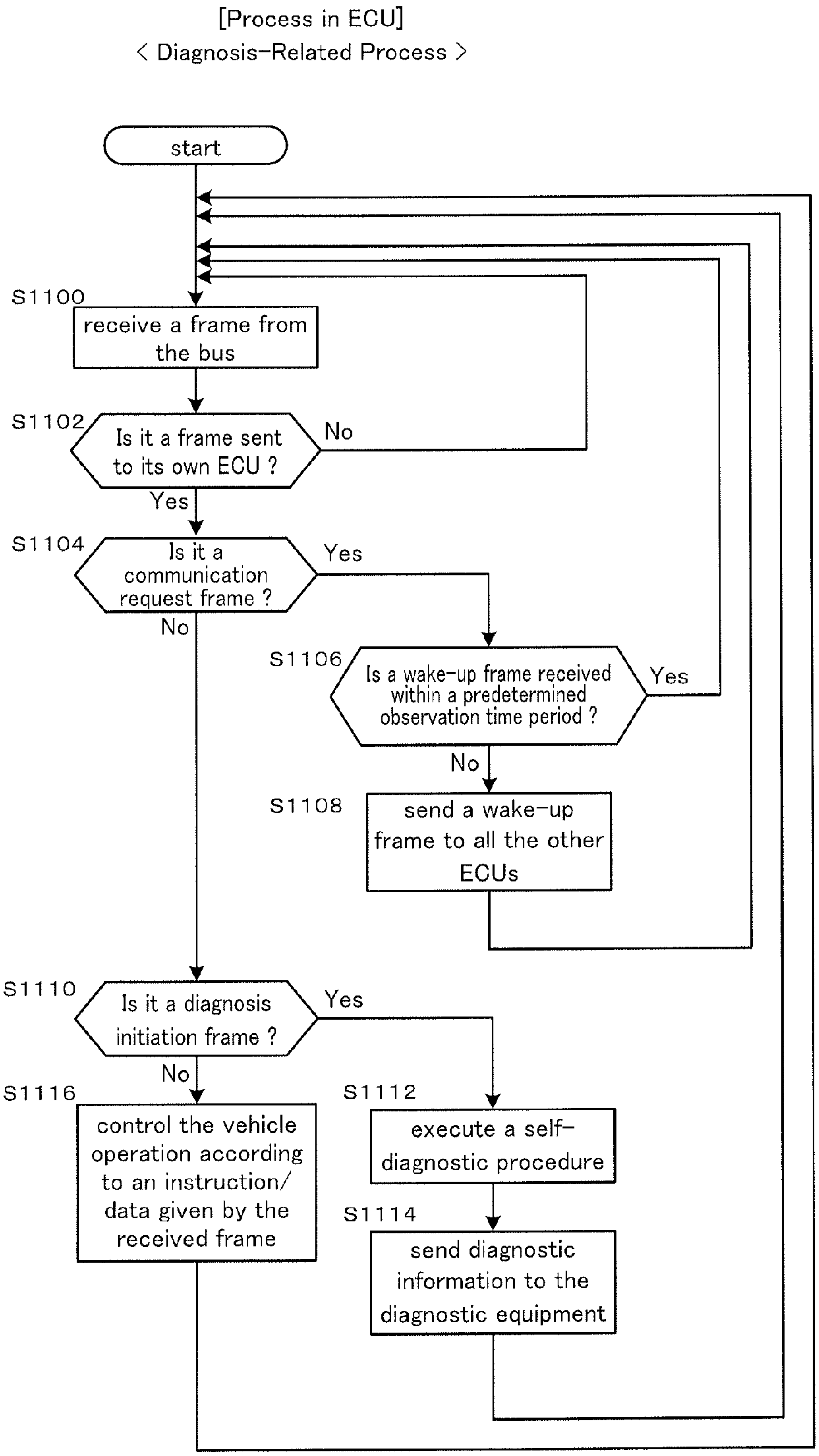
FIG. 24 shows a flow diagram of a diagnosis-related process in the ECU used in the vehicle diagnostic system according to the fourth embodiment.

And, in FIG. 26, each predetermined candidate ECU 3104 which received the communication request frame waits for a reception of a wake-up frame until the observation time set to itself has elapsed (S1202) (which corresponds to the steps S1100 through S1106 in FIG. 24). Then, one candidate ECU 3104 which does not receives the wake-up frame within its observation time period sends a wake-up frame immediately to all of the other ECUs 3104 (S1204) (which corresponds to the step S1108 in FIG. 24).

In the example shown in FIG. 25, the ECU 3104*a* is failed and incapable of communication, so that the ECU 3104*a* can not sends a wake-up frame even though its observation time, 1 second, has elapsed after the equipment 3102 transmitted the communication request frame. Consequently, at a time when 2 seconds has elapsed without a wake-up frame being sent out from any candidate ECU 3104 after the transmission of the communication request frame from the equipment 3102, the candidate ECU 3104*c* having 2 seconds of the observation time sends a wake-up frame to all of the ECUs 3104. Then, the wake-up frame sent from the ECU 3104*c* is received by the ECUs 3104*b* and 3104*d* (while the failed ECU 3104*a* does not receive the wake-up frame), as expressed by an arrow 3502. Thus, the diagnostic equipment 3102 can collect diagnostic information from all of the ECUs 3104*b* through 3104*d* excluding the failed ECU 3104*a*.

In FIG. 25, even if the ECU 3104*a* is just in the sleep mode, not failed, the ECU 3104*a* could not receive the communication request frame from the equipment 3102, and thus, the ECU 3104*a* would not send a wake-up frame at a time when its observation time has elapsed, similarly as described above. However, in this case, the wake-up frame sent from the ECU 3104*c* would be received also by the ECU 3104*a*, and then, the ECU 3104*a* would return to the normal mode. As a result, the equipment 3102 could collect diagnostic information all of the ECUs 3104 including the ECU 3104*a*.

Steps S1206 through S1212 in FIG. 26 are the same as the steps S510 through S516 shown in FIG. 9, respectively. Therefore, the above descriptions regarding these steps in FIG. 9 are incorporated here as the descriptions for those steps in FIG. 26.

In this embodiment, each ECU 3104 watches for a wake-up frame being sent out on the bus 108 over its observation time. Alternatively, each ECU 3104 may watch for a frame other than a wake-up frame. For example, the ECU 3104 may be configured to send a response frame for the communication request frame (i.e., a frame indicative of the reception of the communication request frame) just before sending a wake-up frame. And, one ECU 3104 which does not receives the response frame sent out from any one of the other ECUs 3104 within its own observation time period may send out the response frame and the wake-up frame.

As described above, in the vehicle diagnostic system according to each of the embodiments, a diagnostic equipment sends to one ECU a predefined frame (communication request frame) conforming to the standards for the diagnostic communication. And then, in response to receiving the predefined frame, the one ECU sends a frame (wake-up frame) not conforming to the standards for the diagnostic communication to all of the other ECUs for instructing them to return to the normal mode.

Thus, in the vehicle diagnostic system according to each of the first to fourth embodiments, the diagnostic equipment compliant to the standards for the diagnostic communication can be used without being modified in its software platform for handling a wake-up frame not conforming to said standards (i.e., may be used as it is designed), to instruct ECUs for partial networking to return from the sleep mode to the normal mode and collect the diagnostic information from all of the ECUs.

REFERENCE SIGNS LIST

10, 20, 30, 40 vehicle diagnostic system
100, 3100 in-vehicle network
102, 1102, 2102, 3102 diagnostic equipment
104, 3104 ECU
108 bus
200, 300, 1300, 2300, 3300 processing unit
202, 302 CAN communication module
204, 304 transmitter
206, 306 receiver
208 ID check unit
210 vehicle control unit
212 mode transition unit
214 self-diagnosis unit
216, 3216 wake-up instruction unit
310 display unit
312 operation unit
320, 1320, 2320, 3320 information acquisition unit
322 diagnosis processing unit

What is claimed is:

1. A vehicle diagnostic system comprising:

a communication bus mounted on a vehicle;

a plurality of controllers for controlling vehicle operations, the controllers being connected with each other through the communication bus; and a diagnostic equipment to collect diagnostic information from the controllers through the communication bus and to diagnose the vehicle operations;

wherein each controller operates both in a normal mode and in a sleep mode, the normal mode being an operation mode in which all of functions are operational, and the sleep mode being an operation mode in which all of or a part of the functions excluding at least a function for receiving an wake-up instruction to return to the normal mode through the communication bus are suspended, wherein at least two of the controllers are configured to send the wake-up instruction to the other controllers in response to receiving a predetermined signal from the diagnostic equipment, wherein the diagnostic equipment determines whether each of the controllers is in a state capable of communication, and wherein the diagnostic equipment selects one controller determined to be in a state capable of communication from the at least two of the controllers and sends the predetermined signal to the selected one controller.

2. The vehicle diagnostic system according to claim 1, wherein the diagnostic equipment selects the one controller according to predetermined criteria.

3. The vehicle diagnostic system according to claim 2, wherein the predetermined criteria is that, searching controllers capable of communication among the at least two of the controllers in a predetermined order, the controller found first is selected as the one controller.

4. A vehicle diagnostic system comprising:

a communication bus mounted on a vehicle;

a plurality of controllers for controlling vehicle operations, the controllers being connected with each other through the communication bus; and a diagnostic equipment to collect diagnostic information from the controllers through the communication bus and to diagnose the vehicle operations;

wherein each controller operates both in a normal mode and in a sleep mode, the normal mode being an operation mode in which all of functions are operational, and the sleep mode being an operation mode in which all of or a part of the functions excluding at least a function for receiving an wake-up instruction to return to the normal mode through the communication bus are suspended, wherein at least two of the controllers are configured to send the wake-up instruction to the other controllers in response to receiving a predetermined signal from the diagnostic equipment, wherein the diagnostic equipment is configured to send the predetermined signal to the at least two of the controllers simultaneously, wherein each of the at least two of the controllers is assigned a different length of an observation time, and wherein each of the at least two of the controllers sends the wake-up instruction to the other controllers if it does not receives the wake-up instruction from any one of the other controllers within the observation time assigned to its own controller, after receiving the predetermined signal.

* * * * *